US012664246B2

(12) United States Patent
Kurose et al.

(10) Patent No.: US 12,664,246 B2
(45) Date of Patent: Jun. 23, 2026

(54) TERMINAL, SYSTEM, CONTROL METHOD OF TERMINAL, AND STORAGE MEDIUM

(71) Applicant: NEC Corporation, Tokyo (JP)

(72) Inventors: Haruka Kurose, Tokyo (JP); Takumi Otani, Tokyo (JP); Junichi Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 57 days.

(21) Appl. No.: 18/724,318

(22) PCT Filed: Jan. 26, 2022

(86) PCT No.: PCT/JP2022/002818
§ 371 (c)(1),
(2) Date: Jun. 26, 2024

(87) PCT Pub. No.: WO2023/144912
PCT Pub. Date: Aug. 3, 2023

(65) Prior Publication Data
US 2025/0061178 A1     Feb. 20, 2025

(51) Int. Cl.
G06F 21/32 (2013.01)
H04L 9/40 (2022.01)

(52) U.S. Cl.
CPC .......... G06F 21/32 (2013.01); H04L 63/0807 (2013.01)

(58) Field of Classification Search
CPC ............................ H04L 63/0807; G06F 21/32
See application file for complete search history.

(56) References Cited

U.S. PATENT DOCUMENTS

| | | | | |
|---|---|---|---|---|
| 8,915,423 | B1 * | 12/2014 | Daniel | .................... G06F 21/34 |
| | | | | 235/375 |
| 2022/0027878 | A1 * | 1/2022 | Fairchild | .............. G06Q 50/265 |
| 2022/0414195 | A1 * | 12/2022 | Sakaguchi | ............. G06Q 50/40 |

FOREIGN PATENT DOCUMENTS

| | | |
|---|---|---|
| JP | 2015-148918 A | 8/2015 |
| JP | 2020-004088 A | 1/2020 |

(Continued)

OTHER PUBLICATIONS

International preliminary report on patentability (Chapter I of the Patent Cooperation Treaty) for International application No. PCT/JP2022/002818, dated Jul. 30, 2024.

(Continued)

*Primary Examiner* — Clayton R Williams
(74) *Attorney, Agent, or Firm* — Sughrue Mion, PLLC

(57)     ABSTRACT

A terminal includes a determination request unit and a registration unit. The determination request unit transmits to a server apparatus a determination request including biometric information of a target person to be determined regarding a determination as to whether or not a system registration is made to proceed with a predetermined procedure using an authentication terminal that supports biometric authentication. When the target person to be determined is not registered in a system, a registration unit transmits a token issuance request that includes biometric information of the target person to be determined who is not registered in the system to the server apparatus. By transmitting the token issuance request, the registration unit requests the server apparatus to register the target person to be determined in the system who is not registered in system.

14 Claims, 27 Drawing Sheets

TERMINAL

100

(56)                    References Cited

FOREIGN PATENT DOCUMENTS

| | | | |
|---|---|---|---|
| JP | 2020-144447 | A | 9/2020 |
| JP | 6819916 | B1 | 1/2021 |
| JP | 2021-043546 | A | 3/2021 |
| JP | 2021-163457 | A | 10/2021 |
| JP | 2021-196946 | A | 12/2021 |
| WO | 2020/075280 | A | 4/2020 |
| WO | 2021/059526 | A1 | 4/2021 |
| WO | 2021/090448 | A | 5/2021 |
| WO | 2021/100090 | A1 | 5/2021 |
| WO | 2021/171622 | A | 9/2021 |
| WO | 2021/192193 | A1 | 9/2021 |
| WO | 2021/260856 | A1 | 12/2021 |

OTHER PUBLICATIONS

English translation of the international preliminary report on patentability (Chapter I of the Patent Cooperation Treaty) for International application No. PCT/JP2022/002818, dated Jul. 30, 2024.
International Search Report for PCT Application No. PCT/JP2022/002818, mailed on Apr. 5, 2022.
Japanese Office Action for JP Application No. 2022-099339, mailed on Aug. 22, 2023.
Japanese Office Action for JP Application No. 2023-192205, mailed on May 28, 2024.

* cited by examiner

REGISTERED PERSON INFORMATION DATABASE

| TOKEN ID | BIOMETRIC INFORMATION | PASSPORT INFORMATION | | BOARDING PASS INFORMATION | | | |
|---|---|---|---|---|---|---|---|
| | | PASSPORT NUMBER | ... | FLIGHT NUMBER | SEAT NUMBER | ... | ... |
| ID01 | FV01 | P01 | ... | FL01 | S01 | ... | ... |
| ID02 | FV02 | P02 | ... | FL02 | S02 | ... | ... |
| ... | ... | ... | ... | ... | ... | ... | ... |

FIG.11

GUIDANCE FOR PASSENGER

PLEASE PROCEED TO THE GATE ON THE RIGHT.

IF YOU WISH TO PROCEED USING BIOMETRIC AUTHENTICATION, PLEASE CLICK THE "REGISTER" BUTTON.

REGISTER

GUIDANCE FOR PASSENGER

PLEASE PROCEED TO THE GATE ON THE LEFT.

TERMINAL, SYSTEM, CONTROL METHOD OF TERMINAL, AND STORAGE MEDIUM

This application is a National Stage Entry of PCT/JP2022/002818 filed on Jan. 26, 2022, the contents of all of which are incorporated herein by reference, in their entirety.

TECHNICAL FIELD

The present invention relates to a terminal, a system, a control method of the terminal, and a storage medium.

BACKGROUND ART

Technologies aimed at increasing convenience for airport users and technologies aimed at improving operational efficiency in airports are being developed.

For example, Patent Literature 1 describes providing a management server that excludes a user who is not qualified to use a boarding procedure system using biometric authentication. The management server of Patent Literature 1 includes a receiving unit and a generating unit. The receiving unit receives, from a terminal, a token issuance request that includes at least boarding pass information described in a boarding pass and passport information described in a passport. The generating unit performs a first determination regarding the consistency of the boarding pass information and the passport information, and generates a token for the user to use the boarding procedure using biometric information based on the result of the first determination.

Patent Literature 2 describes providing an information processing apparatus, an information processing method, and a program that can improve throughput in a procedure area where a procedure method using biometric authentication or a procedure method using an authentication method other than biometric authentication can be selected. The information processing apparatus of Patent Literature 2 includes an acquisition unit, a matching unit, and a guidance unit. The acquisition unit acquires biometric information of a user in a procedure area where the user can select either a first method using biometric authentication for the procedure or a second method not using biometric authentication for the procedure. The matching unit matches the biometric information with registered biometric information of registered persons that can use the first method, and determines whether the user is a registered person or not. The guidance unit guides the user to a procedure location corresponding to the first method when the user is determined to be the registered person by the matching unit, and generates guidance information to a procedure location corresponding to the second method when the user is determined not to be the registered user.

CITATION LIST

Patent Literature

[PTL 1] International Publication No. WO2021/192193
[PTL 2] Japanese Patent Registration No. JP6819916

SUMMARY OF INVENTION

Technical Problem

As disclosed in Patent Literatures 1 and 2, various procedures are performed using biometric authentication. Although it is necessary to register biometric information in order to proceed using the biometric authentication, some users may arrive at the procedure area without being aware that the registration procedure is required. Such users are not given an opportunity to perform the registration procedure, and the users cannot use the procedure with biometric authentication. That is, there are users who cannot receive the improved convenience provided by the biometric authentication.

Note that this problem cannot be solved even by using the techniques disclosed in Patent Literature 1 and Patent Literature 2 above. This is because Patent Literature 1 only discloses the registration procedure necessary to proceed with the procedure using biometric authentication, and Patent Literature 2 only discloses that it determines whether a user who has reached the procedure area is a registered person or not.

It is a main object of the present invention to provide a terminal, a system, a control method of the terminal, and a storage medium that contribute to improving convenience for a user who has not performed a registration procedure to use biometric authentication.

Solution to Problem

According to a first aspect of the present invention, there is provided a terminal, including: a determination request unit that transmits to a server apparatus a determination request including biometric information of a target person to be determined regarding a determination as to whether or not a system registration is made to proceed with a predetermined procedure using an authentication terminal that supports biometric authentication; and a registration unit that requests the server apparatus to register the target person to be determined in a system who is not registered in the system by transmitting a token issuance request including biometric information of the target person to be determined who is not registered in the system to the server apparatus, when the target person to be determined is not registered in the system.

According to a second aspect of the present invention, there is provided a system, including: an authentication terminal that supports biometric authentication; a server apparatus that performs the biometric authentication using biometric information; and a terminal, wherein the terminal including: a determination request unit that transmits to the server apparatus a determination request including biometric information of a target person to be determined regarding a determination as to whether or not a system registration is made to proceed with a predetermined procedure using the authentication terminal; and a registration unit that requests the server apparatus to register the target person to be determined in a system who is not registered in the system by transmitting a token issuance request including biometric information of the target person to be determined who is not registered in the system to the server apparatus, when the target person to be determined is not registered in the system.

According to a third aspect of the present invention, there is provided a control method of a terminal, the control method including: transmitting to a server apparatus a determination request including biometric information of a target person to be determined regarding a determination as to whether or not a system registration is made to proceed with a predetermined procedure using an authentication terminal that supports biometric authentication; and requesting the server apparatus to register the target person to be determined in a system who is not registered in the system by transmitting a token issuance request including biometric information of the target person to be determined who is not registered in the system to the server apparatus, when the target person to be determined is not registered in the system.

According to a fourth aspect of the present invention, there is provided a computer-readable storage medium storing a program causing a computer mounted on a terminal to perform processing for: transmitting to a server apparatus a determination request including biometric information of a target person to be determined regarding a determination as to whether or not a system registration is made to proceed with a predetermined procedure using an authentication terminal that supports biometric authentication; and requesting the server apparatus to register the target person to be determined in a system who is not registered in the system by transmitting a token issuance request including biometric information of the target person to be determined who is not registered in the system to the server apparatus, when the target person to be determined is not registered in the system.

Advantageous Effects of Invention

The individual aspects of the present invention provide a terminal, a system, a control method of the terminal, and a storage medium that contribute to improving convenience for a user who has not performed a registration procedure to use biometric authentication. The advantageous effects of the present invention are not limited to the above advantageous effect. The present invention may provide other advantageous effects, instead of or in addition to the above advantageous effect.

BRIEF DESCRIPTION OF THE DRAWINGS

FIG. 11 is a diagram illustrating an example of a registered person information database according to the first example embodiment.

EXAMPLE EMBODIMENT

Figure 1:
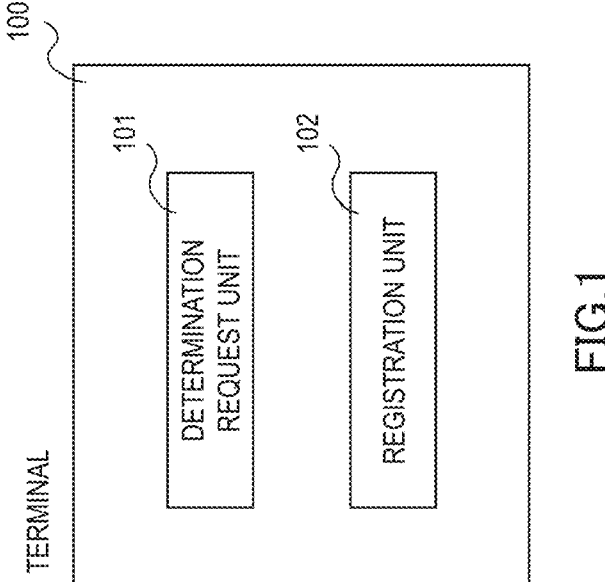
FIG. 1 is a diagram illustrating an outline of an example embodiment.

First, an outline of an example embodiment will be described. In the following outline, various components are denoted by reference characters for the sake of convenience. That is, the following reference characters are used as examples to facilitate the understanding of the present invention. Thus, the description of the outline is not intended to impose any limitations. In addition, unless otherwise specified, an individual block illustrated in the drawings represents a configuration of a functional unit, not a hardware unit. An individual connection line between blocks in the drawings signifies both one-way and two-way directions. An arrow schematically illustrates a principal signal (data) flow and does not exclude bidirectionality. In the present description and drawings, elements that can be described in a like way will be denoted by a like reference character, and redundant description thereof will be omitted as needed.

Figure 2:
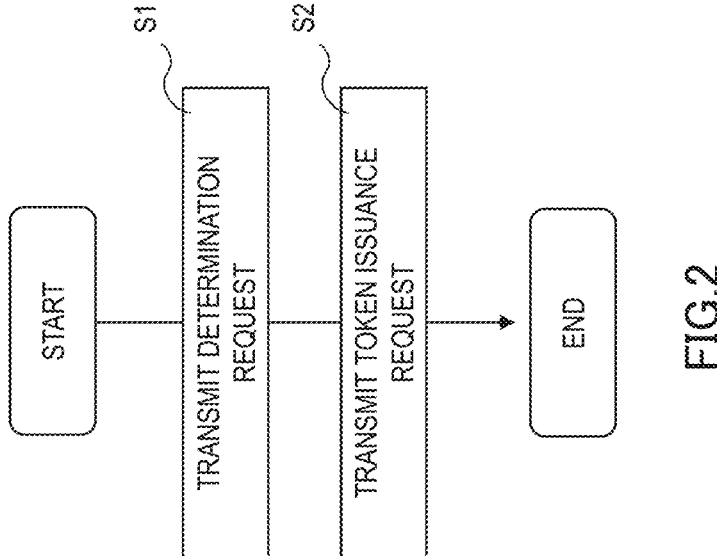
FIG. 2 is a flowchart illustrating an operation of an example embodiment.

A terminal 100 according to an example embodiment includes a determination request unit 101 and a registration unit 102 (see FIG. 1). The determination request unit 101 transmits to a server apparatus a determination request including biometric information of a target person to be determined regarding a determination as to whether or not a system registration is made to proceed with a predetermined procedure using an authentication terminal that supports biometric authentication (step S1 in FIG. 2). When the target person to be determined is not registered in a system, a registration unit 102 transmits a token issuance request that includes biometric information of the target person to be determined who is not registered in the system to the server apparatus (step S2). By transmitting the token issuance request, the registration unit 102 requests the server apparatus to register the target person to be determined in the system who is not registered in system.

The terminal 100 is installed, for example, in a procedure area together with an authentication terminal for proceeding with a procedure that is compatible with biometric authentication and an apparatus for proceeding with a procedure other than biometric authentication. The terminal 100 acquires biometric information of the user and requests the server apparatus to determine whether or not the user is registered in the system. The server apparatus performs a matching processing (authentication processing) using the biometric information and determines that the user (target person to be determined) is registered in the system when the biometric information of the user is registered. The terminal 100 transmits a token issuance request that includes the biometric information to the server apparatus such as when the target person to be determined is not registered in the system and the target person to be determined wishes to be registered in the system. In response to the request, the server apparatus registers the user in the system who is not registered in the system. In this way, the terminal 100 provides an opportunity for the user who does not perform a registration procedure for using biometric authentication to perform the registration procedure. As a result, even a user who has forgotten to perform the registration procedure can receive a benefit of increased convenience provided by biometric authentication.

Hereinafter, specific example embodiments will be described in more detail with reference to drawings.

First Example Embodiment

A first example embodiment will be described in more detail with reference to drawings.

[System Configuration]

Figure 3:
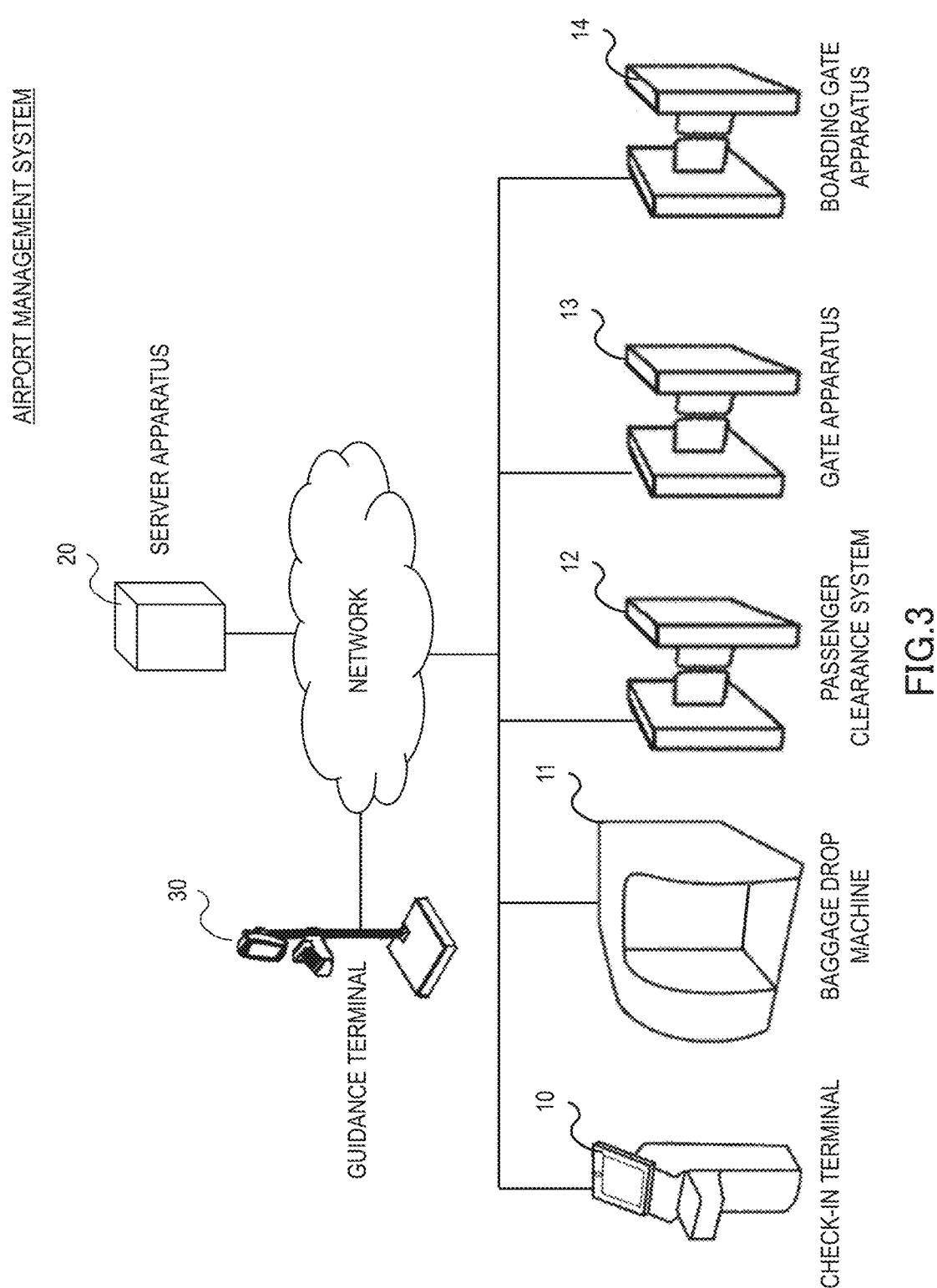
FIG. 3 is a diagram illustrating an example of a schematic configuration of an airport management system according to a first example embodiment.

FIG. 3 is a diagram illustrating an example of a schematic configuration of an airport management system according to a first example embodiment. The airport management system shown in FIG. 3 is operated, for example, by a public organization such as an immigration bureau, or a contractor who is commissioned by the public organization to perform business. For example, the airport management system manages a series of procedures (baggage check-in, security check, and so on) at an airport.

Referring to FIG. 3, the airport management system includes a check-in terminal 10, a baggage drop machine 11, a passenger clearance system 12, a gate apparatus 13, a boarding gate apparatus 14, a server apparatus 20, and a guidance terminal 30.

The baggage drop machine 11, the passenger clearance system 12, the gate apparatus 13, and the boarding gate apparatus 14 are authentication terminals (touch points)

installed at the airport. The authentication terminals and the check-in terminal 10 are connected to the server apparatus 20 via a network. The network shown in FIG. 3 consists of a LAN (Local Area Network) that includes a premises communication network of the airport, a WAN (Wide Area Network), a mobile communication network, and so on. A connection method is not limited to a wired method and may be a wireless method.

The server apparatus 20 is an apparatus that realizes a main function of the airport management system. The server apparatus 20 is installed in a facility of an airport company or airline company, and so on. Alternatively, the server apparatus 20 may be a server located in a cloud on a network.

The guidance terminal 30 is a terminal installed at various locations in the airport that provides information to a user (passenger) regarding procedures in the airport.

Note that the configuration shown in FIG. 3 is an example and is not intended to limit the configuration of the airport management system. The airport management system may include a terminal or the like, which are not shown in the drawings.

[Schematic Operation of System]

Boarding procedure for a user includes check-in, baggage drop-off, security check, emigration inspection, boarding pass verification, and so on.

The user (passenger) can proceed through the above boarding procedure using biometric authentication or using an existing method that does not use the biometric authentication. When the boarding procedure is performed using the biometric authentication, the above-mentioned series of boarding procedures is carried out sequentially at terminals installed at five locations.

The check-in terminal 10 is installed at a check-in lobby in the airport. The check-in terminal 10 is also a self-service terminal for a check-in procedure through operation by the user. The check-in terminal 10 is also referred to as a CUSS (Common Use Self Service) terminal.

When a user (passenger) arrives at the airport, the user operates the check-in terminal 10 and performs a "check-in procedure". The user presents a paper airline ticket, a two-dimensional barcode which describes boarding information, a mobile terminal which displays a copy of the e-ticket, and the like to the check-in terminal 10. The check-in terminal 10 outputs a boarding pass when the check-in procedure is completed. Note that the boarding pass includes both a paper boarding pass and an electronic boarding pass.

The user who has completed the check-in procedure and wishes to proceed with boarding using biometric authentication performs system registration using the check-in terminal 10. Specifically, the user reads the issued boarding pass and a passport into the check-in terminal 10. The check-in terminal 10 also acquires biometric information of the user.

Note that examples of the biometric information include data (feature values) calculated from physical features unique to an individual, such as a face, a fingerprint, a voiceprint, a vein, a retina, or an iris pattern of an eye. Alternatively, the biometric information may be image data such as a face image, a fingerprint image, and so on. The biometric information may be anything that includes physical characteristics of a user as information. In the present application, a case in which biometric information about a "face" of a person (a face image or a feature value generated from the face image) is used will be described.

Figure 4:
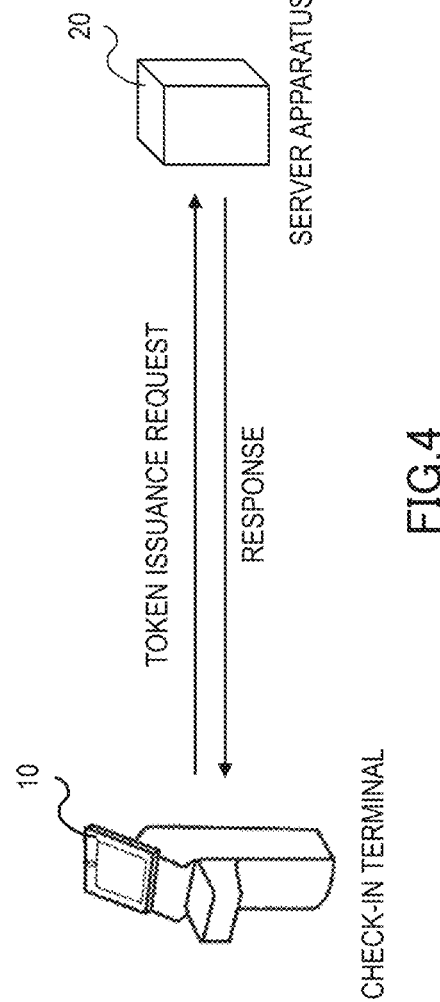
FIG. 4 is a diagram illustrating an operation of the airport management system according to the first example embodiment

The check-in terminal 10 transmits information regarding the boarding pass, passport, and biometric information to the server apparatus 20. Specifically, the check-in terminal 10 transmits a "token issuance request" that includes information described in the boarding pass (boarding pass information), information described in the passport (passport information), and the biometric information (for example, a face image) to the server apparatus 20 (see FIG. 4).

The server apparatus 20 performs an identity verification using the biometric information described in the passport and the biometric information acquired by the check-in terminal 10. The server apparatus 20 determines whether the face image described in the passport and the face image captured by the check-in terminal 10 substantially match.

The server apparatus 20 determines that the identity verification of the user who presented his or her passport to the check-in terminal 10 is successful when the two face images (biometric information) substantially match.

When the identity verification is successful, the server apparatus 20 performs system registration for the user to proceed with the procedure using biometric authentication. Specifically, the server apparatus 20 issues a token to be used for the boarding procedures for the user whose identity verification has been completed.

The issued token is identified by a token ID (Identifier). Information necessary for the boarding procedure (for example, biometric information, operation information necessary for the boarding procedure, and so on) is associated with each other via the token ID. In other words, the "token ID" is issued with system registration of the user and is identification information for the user to undergo the boarding procedure using biometric information. Once the token (token ID) is issued, the user of the system can use the boarding procedure using biometric authentication.

In response to the issuance of the token, the server apparatus 20 adds an entry to a registered person information database that stores detailed information about the token that the server apparatus 20 generated. Details of the registered person information database will be described below.

When the identity verification fails, the server apparatus 20 refuses (rejects) the issuance of the token from the check-in terminal 10.

Once the token is issued (once the user has completed the system registration to proceed using biometric authentication), the user can proceed with the boarding procedure on his/her own (without assistance of an airport staff member, or the like) using the authentication terminal (for example, the baggage drop machine 11, and so on).

Note that a user who wishes to proceed with conventional boarding procedure that does not require biometric authentication may check-in using the check-in terminal 10, or may check-in at a counter where an airline staff member or the like is waiting.

After the user has completed the check-in procedure, the user moves to a baggage drop-off area or a security checkpoint.

In the following descriptions, a user who has been registered in the system for performing boarding procedure using biometric authentication will be referred to as a "registered person in system" or simply as a "registered person". Additionally, a user who has not been registered in the system for performing boarding procedure using biometric authentication will be referred to as a "non-registered person in system" or simply "non-registered person".

A user who has completed the check-in procedure (registered person in system or non-registered person in system) checks his or her baggage, which cannot be carried on board, at the baggage drop-off area.

The registered person uses the baggage drop machine 11 to check in his or her baggage. The baggage drop machine 11 is installed in an area adjacent to a baggage counter (manned counter) in the airport or in the vicinity of the check-in terminal 10. The baggage drop machine 11 is a self-service terminal for the registered person to check in baggage that will not be carried on an aircraft (baggage check-in procedure). The baggage drop machine 11 is also referred to as a CUBD (Common Use Bag Drop) terminal. After the registered person has completed the baggage check-in procedure, the registered person moves to the security checkpoint.

The non-registered person checks his or her baggage with an airline staff member or the like. After the non-registered person has completed the baggage check-in procedures, the non-registered person moves to the security checkpoint. Note that when the user (registered person or non-registered person) does not check baggage, the baggage check-in procedure is omitted.

A user (registered person in system or non-registered person in system) undergoes a security check at the passenger clearance system 12 installed at the security checkpoint.

The passenger clearance system 12 is a gate apparatus installed at an entrance of the security checkpoint in the airport. The passenger clearance system 12, also referred to as the PRS (Passenger Reconciliation System), is a system that determines whether or not the user can pass through the security checkpoint at the entrance of the security checkpoint. After the user has completed the security check procedure by passing through the passenger clearance system 12, the user moves to an emigration inspection area.

The registered person who has passed the security check without any problem can pass directly through the gate apparatus installed at the security checkpoint. On the other hand, the non-registered person is required to present his or her boarding pass and so on to a security inspector even if there is no problem with the result of the security check.

A user (registered person in system or non-registered person in system) undergoes emigration inspection at the departure inspection area.

The registered person undergoes emigration examination at the gate apparatus 13. The gate apparatus 13 is installed at the emigration examination area in the airport. The gate apparatus 13 is an apparatus that automatically performs an emigration examination procedure for the registered person. After the registered person has completed the emigration examination procedure, the registered person moves to a departure area where a duty-free store and boarding gate are located.

The non-registered person undergoes the emigration examination by an emigration and immigration inspector. After the non-registered person has completed the emigration examination procedure, the non-registered person moves to the departure area.

A user (registered person in system or non-registered person in system) moves through the boarding gate apparatus 14 installed in the departure area and moves to a boarding gate.

The registered person passes through the boarding gate apparatus 14 where no airline staff member is waiting nearby. The non-registered person passes through the boarding gate apparatus 14 where an airline staff member is waiting nearby.

The boarding gate apparatus 14 that controls passage of the registered person determines whether or not the registered person can board the aircraft. When the boarding gate apparatus 14 determines that the registered person can board the aircraft, the boarding gate apparatus 14 opens a gate and permits the registered person to pass through the gate.

The boarding gate apparatus 14 where a staff member is waiting nearby does not determine the above. The non-registered person presents his or her passport and boarding pass to the staff member. When the non-registered person is determined to be able to board the aircraft, the staff member permits the non-registered person to pass through the gate.

Figure 5:
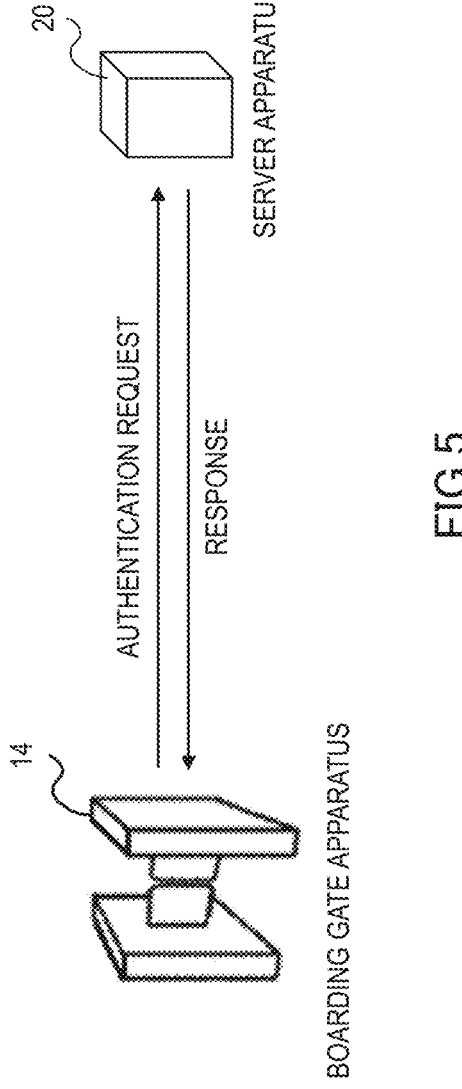
FIG. 5 is a diagram illustrating an operation of the airport management system according to the first example embodiment.

Note that when the registered person in system who has been issued a token arrives at the authentication terminal (for example, the boarding gate apparatus 14), biometric information (for example, a face image) is acquired at the authentication terminal. The authentication terminal transmits an authentication request that includes the biometric information to the server apparatus 20 (see FIG. 5).

The server apparatus 20 identifies the token (entry) by performing a matching processing (1-to-N matching; N is a positive integer, and the same applies to the following description) using the biometric information acquired from the authentication terminal and the biometric information registered in the system. The boarding process for the user is carried out based on operation information associated with the identified token. For example, the server apparatus 20 transmits boarding pass information of the user identified by the matching process to the boarding gate apparatus 14.

The boarding gate apparatus 14 determines whether or not the user (registered person in system) is permitted to pass through based on the received boarding pass information. Specifically, the boarding gate apparatus 14 determines whether or not the user is permitted to pass through based on whether or not the airline code and flight number set by the staff member, or the like in own apparatus and an airline code and flight number in the boarding pass information acquired from the server apparatus 20 match or not. When the airline code and flight number, and so on match, the user is permitted to pass through, and when the airline code, and so on do not match, the user is rejected to pass through.

As described above, the registered person in system (the user who proceeds with the procedure using biometric authentication) can proceed with the procedure independently at each procedure area such as baggage drop-off area, security checkpoint, emigration inspection area, and departure area. On the other hand, the non-registered person in system (the user who proceeds with the existing procedure without using biometric authentication) proceeds with the procedure with the staff member, security inspector, emigration and immigration inspector, or the like waiting at each procedure area such as baggage drop-off area, security checkpoint, emigration inspection area, and departure area.

Since passengers using the airport include both registered persons in system and non-registered persons in system, it is necessary to install an apparatus (facility) for the registered person in system and an apparatus for the non-registered person in system at each procedure area, such as emigration inspection area and departure area. Furthermore, it is necessary for a user (registered person or non-registered person) to be able to appropriately determine which apparatus (facility) he or she is going to use.

For example, in the departure area, the registered person can pass through the boarding gate apparatus 14 using biometric authentication and therefore needs to go to the boarding gate apparatus 14 where no staff member is waiting. On the other hand, the non-registered person cannot pass through the boarding gate apparatus 14 using biometric authentication and therefore needs to go to the boarding gate apparatus 14 where a staff member is waiting.

Figure 6:
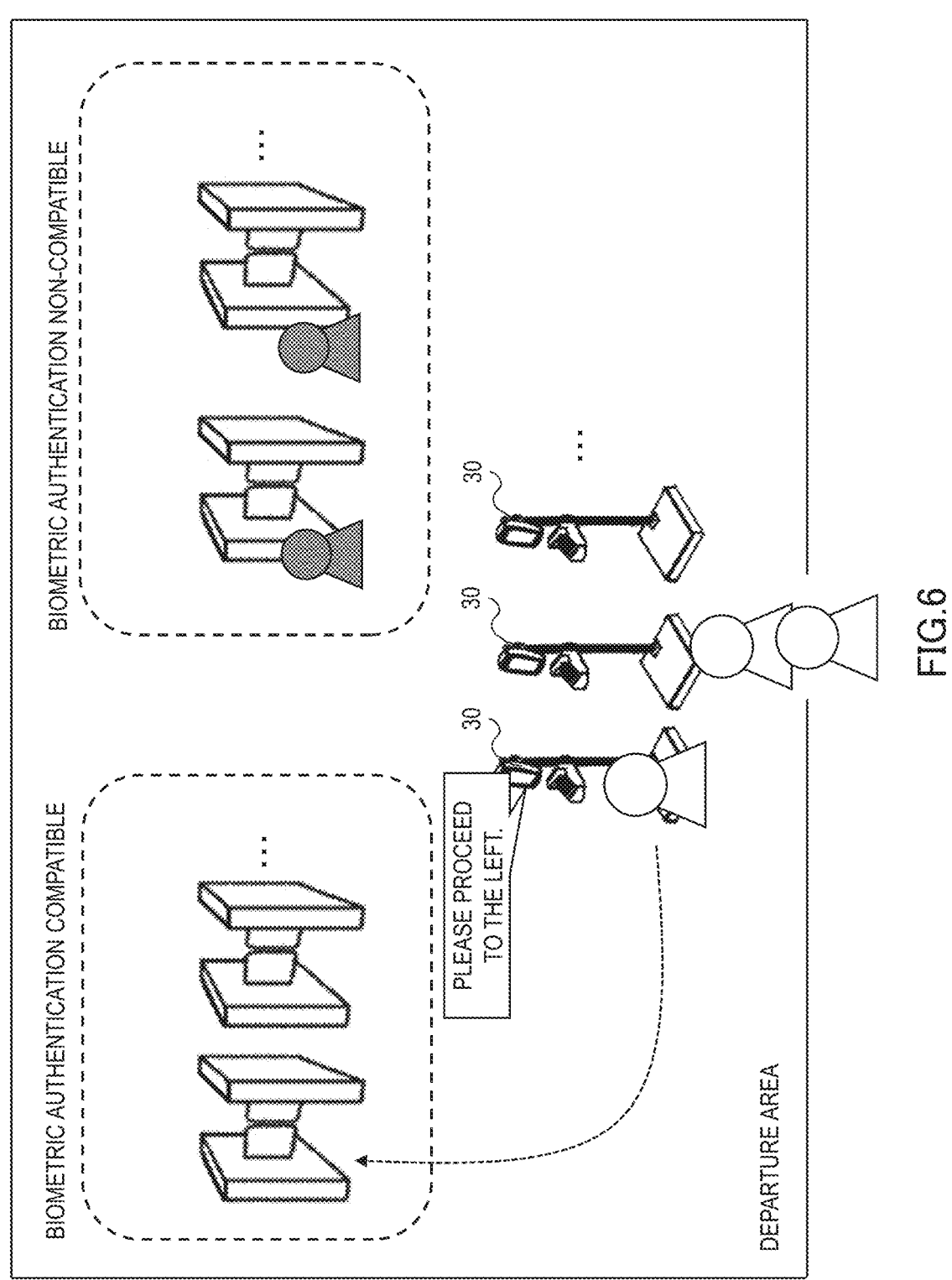
FIG. 6 is a diagram illustrating an operation of the airport management system according to the first example embodiment.

Therefore, in order to enable each registered person and non-registered person to recognize the apparatus (authentication terminal, facility) to be used, the guidance terminal 30 is installed in each procedure area (baggage drop-off area, security inspection area, emigration inspection area, and departure area) at the airport. The first example embodiment will be described using an example when the guidance terminal 30 is installed in the departure area, as shown in FIG. 6.

The user who has moved to each procedure area (departure area in the example in FIG. 6) moves in front of the guidance terminal 30. As shown in FIG. 6, when a plurality of guidance terminals 30 are installed in the same procedure area, the user moves in front of an empty guidance terminal 30.

Figure 7:
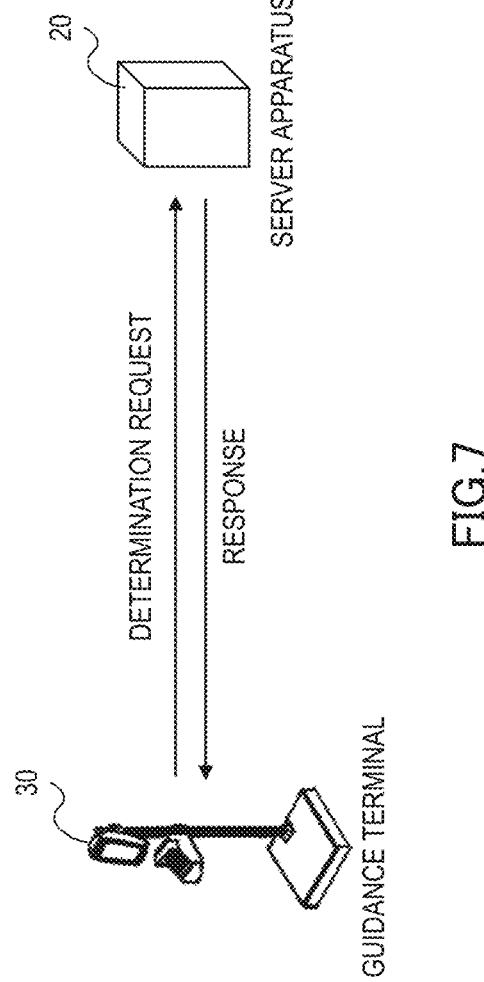
FIG. 7 is a diagram illustrating an operation of the airport management system according to the first example embodiment.

The guidance terminal 30 acquires biometric information of a user in front of the guidance terminal 30 and transmits a "determination request" including the acquired biometric information to the server apparatus 20 (see FIG. 7).

The server apparatus 20 performs a matching processing using the acquired biometric information and biometric information registered by the registered person in system in advance.

When the matching processing is successful (when biometric information that substantially matches the acquired biometric information is registered), the server apparatus 20 notifies the guidance terminal 30 that the user who has arrived in front of the guidance terminal 30 is the "registered person in system".

When the matching processing fails (when biometric information that substantially matches the acquired biometric information is not registered), the server apparatus 20 notifies the guidance terminal 30 that the user who has arrived in front of the guidance terminal 30 is the "non-registered person in system".

The guidance terminal 30 performs a processing in accordance with the received result of determination (target person to be determined is a registered person or a non-registered person). Specifically, when the target person to be determined is a registered person, the guidance terminal 30 guides the registered person to the boarding gate apparatus 14 (gate that supports biometric authentication) where no staff member is waiting. When the target person to be determined is a non-registered person, the guidance terminal 30 guides the non-registered person to the boarding gate apparatus 14 (gate that does not support biometric authentication) where a staff member is waiting.

In this way, the guidance terminal 30 includes a function (guidance function) that guides the user (registered person in system or non-registered person in system) to proceed with the predetermined procedure.

Furthermore, the guidance terminal 30, like the check-in terminal 10, includes a function (registration function) that allows the user to register with the system in order to proceed with the procedure using biometric authentication.

Specifically, when the target person to be determined is a non-registered person and the non-registered person wishes to register with the system, the guidance terminal 30 performs the same processing for issuing a token as the check-in terminal 10. More specifically, the guidance terminal 30 transmits a token issuance request that includes biometric information, passport information, and boarding pass information of the person who wishes to register with the system to the server apparatus 20.

Once the user has completed system registration at the guidance terminal 30, the user changes from a non-registered person to a registered person, and subsequent procedures can be smoothly proceeded using biometric authentication. In other words, when the procedure does not use biometric authentication, the time required for one person (non-registered person) at each terminal will be long, and there may be a waiting queue at each terminal. However, when the procedure uses biometric authentication, the user (registered person) does not need to stand in such a queue.

In this way, the guidance terminal 30 includes two functions (guidance function and registration function). The guidance terminal 30 is configured to be able to enable or disable (activate or deactivate) these two functions and to switch processing contents. The guidance terminal 30 is set to an appropriate mode of operation depending on location where the guidance terminal 30 is installed and conditions at the time of operation. For example, an airline staff member sets the mode of operation of the guidance terminal 30.

For example, the guidance terminal 30 includes four modes of operation.

The first mode of operation is a mode in which both the guidance function and the registration function are enabled.

The second mode of operation is a mode in which the guidance function is enabled and the registration function is disabled.

The third mode of operation is a mode in which the guidance function is enabled, the system registration is prompted by another apparatus (terminal or device), and the registration function is disabled.

The fourth mode of operation is a mode in which the guidance function is disabled and the registration function is enabled.

The first example embodiment will describe a case in which the guidance terminal 30 in which the first mode of operation is set.

Note that the boarding procedure using biometric authentication using each authentication terminal (baggage drop machine 11, passenger clearance system 12, gate apparatus 13, boarding gate apparatus 14) shown in FIG. 3 is an example, and is not intended to limit the apparatuses used in the procedure. For example, an apparatus different from the above apparatuses may be used for the boarding procedure, or some of the above individual apparatuses may not be used for the procedure. For example, the gate apparatus 13 may not be included in the airport management system.

Next, details of the individual apparatuses included in the airport management system according to the first example embodiment will be described.

[Check-In Terminal]

As described above, the check-in terminal 10 is an apparatus that provides operations regarding the check-in procedure and the system registration to a user of the system.

Figure 8:
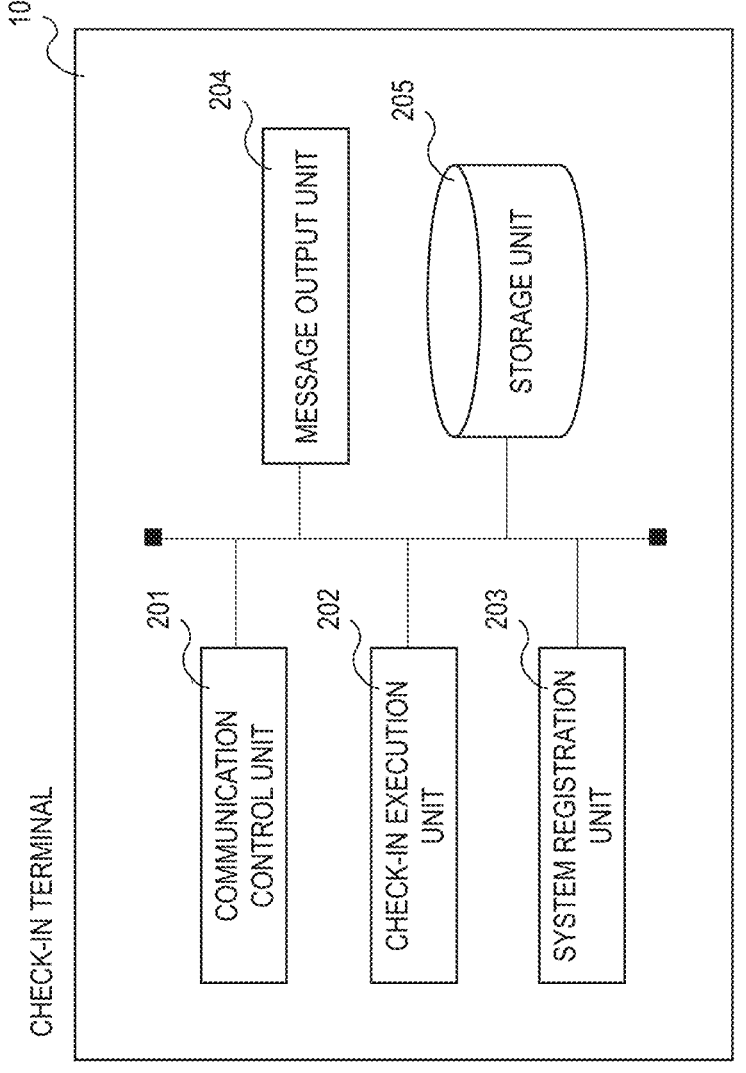
FIG. 8 is a diagram illustrating an example of a processing configuration of a check-in terminal according to the first example embodiment.

FIG. 8 is a diagram illustrating an example of a processing configuration (processing modules) of the check-in terminal 10 according to the first example embodiment. Referring to FIG. 8, the check-in terminal 10 includes a communication control unit 201, a check-in execution unit 202, a system registration unit 203, a message output unit 204, and a storage unit 205.

The communication control unit 201 is means for controlling communication with other apparatuses. For example, the communication control unit 201 receives data (packets) from the server apparatus 20. In addition, the communication control unit 201 transmits data to the server apparatus 20. The communication control unit 201 gives data received from other apparatuses to other processing modules. The communication control unit 201 transmits data acquired from other processing modules to other apparatuses. In this way, other processing modules transmit and receive data to and from other apparatuses via the communication control unit 201. The communication control unit 201 includes a function as a receiving unit that receives data from other apparatuses and a function as a transmitting unit that transmits data to other apparatuses.

The check-in execution unit 202 is means for performing the check-in procedure for a user. The check-in execution unit 202 executes the check-in procedure such as seat selection, and so on based on an airline ticket presented by the user. For example, the check-in execution unit 202 transmits information described on the airline ticket to a DCS (Departure Control System) and acquires information to be described on a boarding pass from the DCS. Note that an operation of the check-in execution unit 202 can be the same as that of an existing check-in terminal, so a more detailed explanation will be omitted.

The system registration unit 203 is means for performing system registration of a user who wishes to undergo the boarding procedure using biometric authentication. For example, the system registration unit 203 displays a GUI (Graphical User Interface) to confirm whether or not the user wishes to use the "boarding procedure using a face image" after the check-in procedure is completed.

When a user wishes to register with the system, the system registration unit 203 acquires the three pieces of information (boarding pass information, passport information, and biometric information) using a GUI for acquiring the three pieces of information. The system registration unit 203 acquires the boarding pass information and passport information from the boarding pass and passport held by the user. The system registration unit 203 controls a reader such as a scanner (not shown) and acquires the information described on the boarding pass (boarding pass information) and the information described in the passport (passport information).

The boarding pass information includes a name (first name, last name), airline code, flight number, boarding date, place of departure (boarding airport), destination (arrival airport), seat number, boarding time, arrival time, and so on. The passport information includes a passport face image, name, gender, nationality, passport number, passport issuing country, and so on.

Moreover, the system registration unit 203 acquires biometric information of a user. The system registration unit 203 controls a camera and acquires a face image of the user. For example, when the system registration unit 203 detects a face in an image that is constantly or periodically captured, the system registration unit 203 captures the face of the user and acquires the face image of the face.

After that, the system registration unit 203 generates a token issuance request that includes the acquired three pieces of information (boarding pass information, passport information, and biometric information).

For example, the system registration unit 203 generates the token issuance request that includes an identifier of the own device (hereinafter referred to as "terminal ID"), the boarding pass information, the passport information, and the biometric information. Note that a MAC (Media Access Control) address or an IP (Internet Protocol) address of the check-in terminal 10 can be used as the terminal ID. The system registration unit 203 transmits the generated token issuance request to the server apparatus 20.

The system registration unit 203 hands over the response acquired from the server apparatus 20 (response to the token issuance request) to the message output unit 204.

The message output unit 204 is means for outputting various messages. For example, the message output unit 204 outputs a message in accordance with the response acquired from the server apparatus 20.

When the message output unit 204 receives a response (positive response) that the token has been successfully issued, the message output unit 204 outputs a message to that effect. For example, the message output unit 204 outputs a message such as "Future procedures can be performed using face recognition".

When the message output unit 204 receives a response (negative response) that the token has failed to be issued, the message output unit 204 outputs a message to that effect. For example, the message output unit 204 outputs a message "We are sorry. You cannot proceed with the procedure using face recognition. Please head to a manned booth.".

The storage unit 205 is means for storing information necessary for the operation of the check-in terminal 10.
[Boarding Gate Apparatus]

Figure 9:
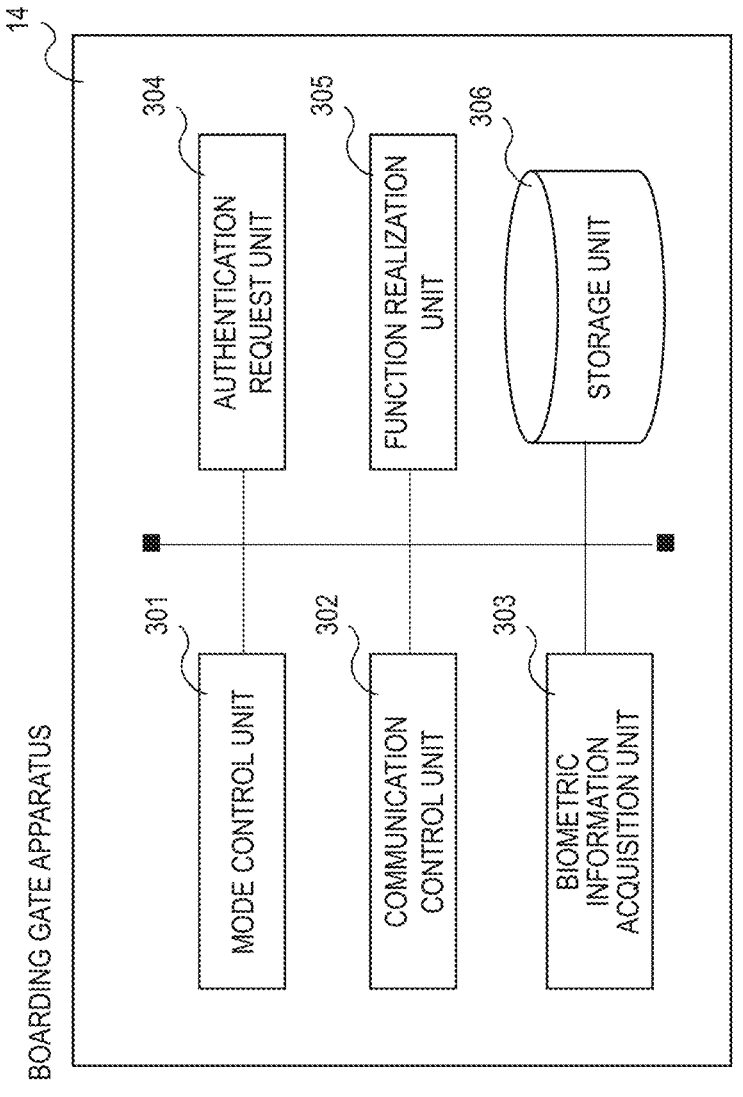
FIG. 9 is a diagram illustrating an example of a processing configuration of a boarding gate apparatus according to the first example embodiment.

FIG. 9 is a diagram illustrating an example of a processing configuration (processing modules) of the boarding gate apparatus 14 according to the first example embodiment. Referring to FIG. 9, the boarding gate apparatus 14 includes a mode control unit 301, a communication control unit 302, a biometric information acquisition unit 303, an authentication request unit 304, a function realization unit 305, and a storage unit 306.

The mode control unit 301 is means for controlling a mode of operation of the boarding gate apparatus 14. For example, the mode control unit 301 acquires the mode of operation (biometric authentication compatible mode, biometric authentication non-compatible mode, or power off mode) in accordance with a switch attached to the boarding gate apparatus 14. Alternatively, the mode control unit 301 may acquire the mode of operation using a GUI (Graphical User Interface) displayed on a liquid crystal panel or the like.

Note that the main function of the boarding gate apparatus 14 that is set to the biometric authentication non-compliant mode does not operate. This is because the staff member waiting near the boarding gate apparatus 14 determines whether or not a user (non-registered person in system) is permitted to pass through the gate. Therefore, operations of each processing module described below are operations in the biometric authentication compatible mode.

The communication control unit 302 is means for controlling communication with other apparatuses. For example, the communication control unit 302 receives data (packets) from the server apparatus 20. In addition, the communication control unit 302 transmits data to the server apparatus 20. The communication control unit 302 gives data received from other apparatuses to other processing modules. The communication control unit 302 transmits data acquired from other processing modules to other apparatuses. In this way, other processing modules transmit and receive data to and from other apparatuses via the communication control unit 302. The communication control unit 302 includes a function as a receiving unit that receives data from other apparatuses and a function as a transmitting unit that transmits data to other apparatuses.

The biometric information acquisition unit 303 is means for controlling a camera (not shown) and acquiring biometric information of a user (person to be authenticated). The biometric information acquisition unit 303 takes an image in front of own apparatus periodically or at predetermined timing. The biometric information acquisition unit 303 determines whether or not the acquired image includes a human face image, and when the face image is included, extracts the face image from the acquired image data.

An existing technique can be used for the face image detection and extraction processing performed by the biometric information acquisition unit 303, and therefore, detailed description thereof will be omitted. For example, the biometric information acquisition unit 303 may extract a face image (a face area) from the image data by using a learning model learned by a CNN (Convolutional Neural Network). Alternatively, the biometric information acquisition unit 303 may extract a face image by using a technique such as template matching.

The biometric information acquisition unit 303 gives the extracted face image to the authentication request unit 304.

The authentication request unit 304 is means for requesting the server apparatus 20 for an authentication regarding the user in front of the authentication request unit 304. The authentication request unit 304 generates an authentication request that includes the acquired face image and transmits the authentication request to the server apparatus 20.

The authentication request unit 304 receives a response from the server apparatus 20 to the authentication request.

The authentication request unit 304 hands over the result of authentication (authentication success or authentication failure) acquired from the server apparatus 20 to the function realization unit 305. When the authentication is successful, the authentication request unit 304 also hands over "operation information" acquired from the server apparatus 20 to the function realization unit 305.

The function realization unit 305 is means for realizing a "control of passage of user" function of the boarding gate apparatus 14.

When the result of authentication is "authentication failure", the function realization unit 305 notifies the user (the person who has failed authentication; the person to be authenticated who is determined to have failed in authentication) to that effect. In addition, the function realization unit 305 closes a flapper, gate, and so on, and rejects the user to pass through.

In case of successful authentication, the function realization unit 305 acquires the airline code, flight number, and so on that are described on the boarding pass issued to the user from the operation information (boarding pass information) that the function realization unit 305 has acquired. The function realization unit 305 determines whether the airline code and flight number preset in own apparatus by an airline staff member, or the like, and the airline code and flight number acquired from the server apparatus 20 match or do not match.

When the airline code, and so on, match, the function realization unit 305 permits the user (registered person in system) to pass through the gate. The function realization unit 305 opens the flapper, gate, and so on, and permits the user to pass through.

When the airline code, and so on, do not match, the function realization unit 305 rejects the user to pass through the gate. The function realization unit 305 closes the flapper, gate, and so on, and rejects the user to pass through.

The storage unit 306 is means for storing information necessary for the operation of the boarding gate apparatus 14.
[Other Authentication Terminals]

Basic processing configuration of the other authentication terminals (the baggage drop machine 11, the passenger clearance system 12, and the gate apparatus 13) included in the airport management system can be the same as the processing configuration of the boarding gate apparatus 14 shown in FIG. 9, so a detailed description will be omitted. Each terminal similarly acquires biometric information (face image) of the person to be authenticated and requests an authentication using the acquired biometric information to the server apparatus 20. When the authentication is successful, the functions assigned to each terminal are executed.

[Server Apparatus]

Figure 10:
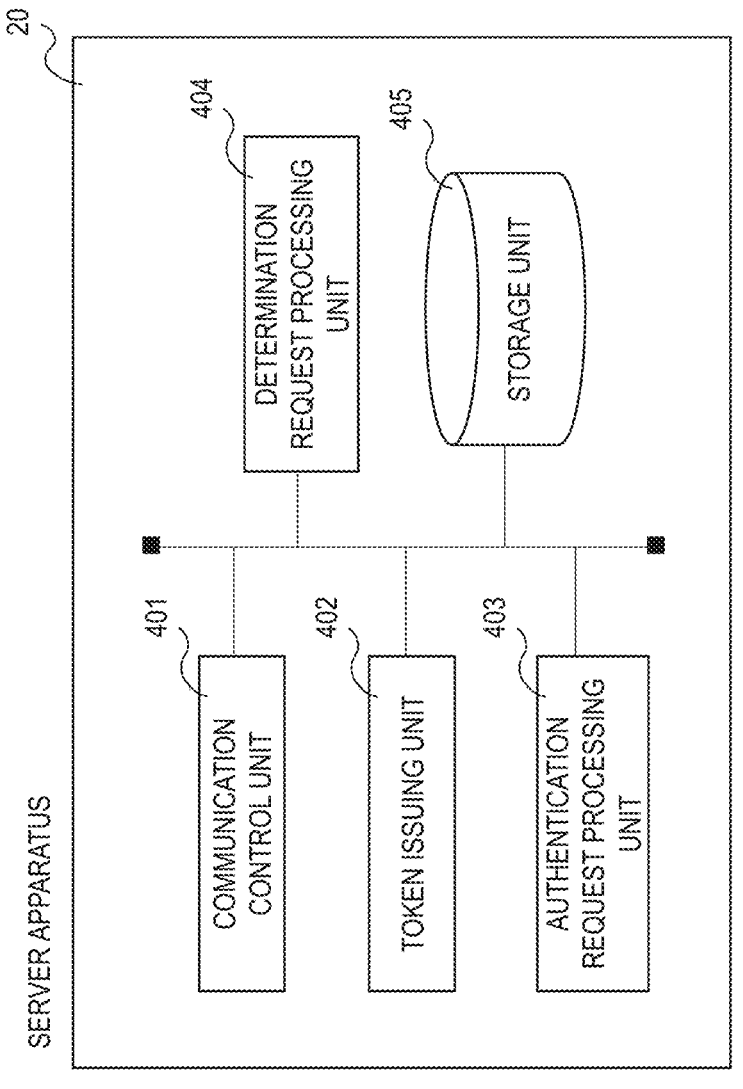
FIG. 10 is a diagram illustrating an example of a processing configuration of a server apparatus according to the first example embodiment.

FIG. 10 is a diagram illustrating an example of a processing configuration (processing modules) of the server apparatus 20 according to the first example embodiment. Referring to FIG. 10, the server apparatus 20 includes a communication control unit 401, a token issuing unit 402, an authentication request processing unit 403, a determination request processing unit 404, and a storage unit 405.

The communication control unit 401 is means for controlling communication with other apparatuses. For example, the communication control unit 401 receives data (packets) from the check-in terminal 10, and so on. In addition, the communication control unit 401 transmits data to the check-in terminal 10, and so on. The communication control unit 401 gives data received from other apparatuses to other processing modules. The communication control unit 401 transmits data acquired from other processing modules to other apparatuses. In this way, other processing modules transmit and receive data to and from other apparatuses via the communication control unit 401. The communication control unit 401 includes a function as a receiving unit that receives data from other apparatuses and a function as a transmitting unit that transmits data to other apparatuses.

The token issuing unit 402 is means for issuing a token in response to a token issuance request from the check-in terminal 10 or the guidance terminal 30. The token issuing unit 402 extracts a face image included in the token issuance request (a face image of a user who wishes to register with the system) and a face image included in the passport information. The token issuing unit 402 determines whether or not these two face images substantially match and performs an identity verification.

The token issuing unit 402 performs matching (one-to-one matching) between the above two face images. At that time, the token issuing unit 402 generates a feature value from each of the two images.

Note that since an existing technology can be used to generate the feature values, a detailed description thereof will be omitted. For example, the token issuing unit 402 extracts eyes, nose, mouth, and so on as feature points from the face image. After that, the token issuing unit 402 calculates the location of individual feature point and the distance between individual feature points as a feature value (generate a feature vector consisting of a plurality of feature values).

The token issuing unit 402 calculates the similarity of the two images based on the feature value, and determines whether the two images are face images of the same person or not based on a result of the threshold processing for the calculated similarity. Note that the chi-squared distance, the Euclidean distance, or the like can be used for the individual similarity. A longer distance represents a lower similarity, and a shorter distance represents a higher similarity.

For example, when the similarity is greater than a predetermined value (when the distance is shorter than a predetermined value), the token issuing unit 402 determines that the two face images indicate the same person (determines that the identity verification is successful). When the similarity is less than or equal to the predetermined value, the token issuing unit 402 determines that the two face images do not indicate the same person (determines that the identity verification fails).

When the identity verification is successful, the token issuing unit 402 issues a token. For example, the token issuing unit 402 generates a unique value as a token ID based on the date and time of processing, sequence number, and so on.

When the token issuing unit 402 generates the token (token ID), the token issuing unit 402 transmits a positive response (the token has been successfully issued) to a sender of the token issuance request (the check-in terminal 10 or the guidance terminal 30). When the token issuing unit 402 fails to generate a token ID, the token issuing unit 402 transmits a negative response (the token has failed to be issued) to the sender of the token issuance request (the check-in terminal 10 or the guidance terminal 30).

When the token issuing unit 402 succeeds in generating (issuing) the token ID, token issuing unit 402 registers the generated token ID, boarding pass information, passport information, and biometric information (feature value) in the registered person information database (see FIG. 11).

The authentication request processing unit 403 is means for processing an authentication request acquired from each authentication terminal, such as baggage drop machine 11 and boarding gate apparatus 14. The authentication request includes biometric information of the person to be authenticated. The authentication request processing unit 403 performs a matching processing (1-to-N matching; N is a positive integer, and the same applies to the following description) using biometric information included in the authentication request and the biometric information stored in the registered person information database.

The authentication request processing unit 403 generates a feature value from a face image acquired from the authentication terminal. The authentication request processing unit 403 sets the generated feature value (feature vector) as the feature value of matching side and feature value registered in the registered person information database as the feature value of the registration side, respectively.

The authentication request processing unit 403 determines that the matching processing has been successful when there exists a feature value whose similarity between the feature value among the plurality of feature values registered in the registered person information database and the feature value of the target to be matched is greater than a predetermined value.

When the authentication is successful, the authentication request processing unit 403 reads the operation information (passport information, boarding pass information, and so on) of an entry corresponding to the feature value with the highest similarity from the registered person information database.

The authentication request processing unit 403 transmits the result of authentication to the authentication terminal (responds to the authentication request). When the authentication is successful, the authentication request processing unit 403 transmits a positive response that includes that fact (authentication success) and the operation information to the authentication terminal. When the authentication fails, the authentication request processing unit 403 transmits a negative response that includes that fact (authentication failure) to the authentication terminal.

The determination request processing unit 404 is means for processing a determination request acquired from the guidance terminal 30. Similar to the authentication request processing unit 403, the determination request processing unit 404 performs a matching processing (1-to-N matching) using biometric information included in the authentication request and the biometric information registered in the registered person information database.

When the matching processing is successful (when the biometric information that substantially matches the biometric information included in the determination request is registered in the registered person information database), the determination request processing unit 404 transmits a positive response indicating that the determination has been successful (that the person to be determined is the registered person in system) to the guidance terminal 30.

When the matching processing fails (when the biometric information that substantially matches the biometric information in the determination request is not registered in the registered person information database), the determination request processing unit 404 transmits a negative response indicating that the determination has failed (that the person to be determined is the non-registered person in system) to the guidance terminal 30.

The storage unit 405 stores various kinds of information necessary for the operation of the server apparatus 20. The registered person information database is established in the storage unit 405.

[Guidance Terminal]

As described above, the guidance terminal 30 includes the function of guiding a user and registering a user in the system. The guidance terminal 30 is configured to be portable and can be installed in any location. Of course, the guidance terminal 30 can also be used while being fixed at a predetermined location.

Figure 12:
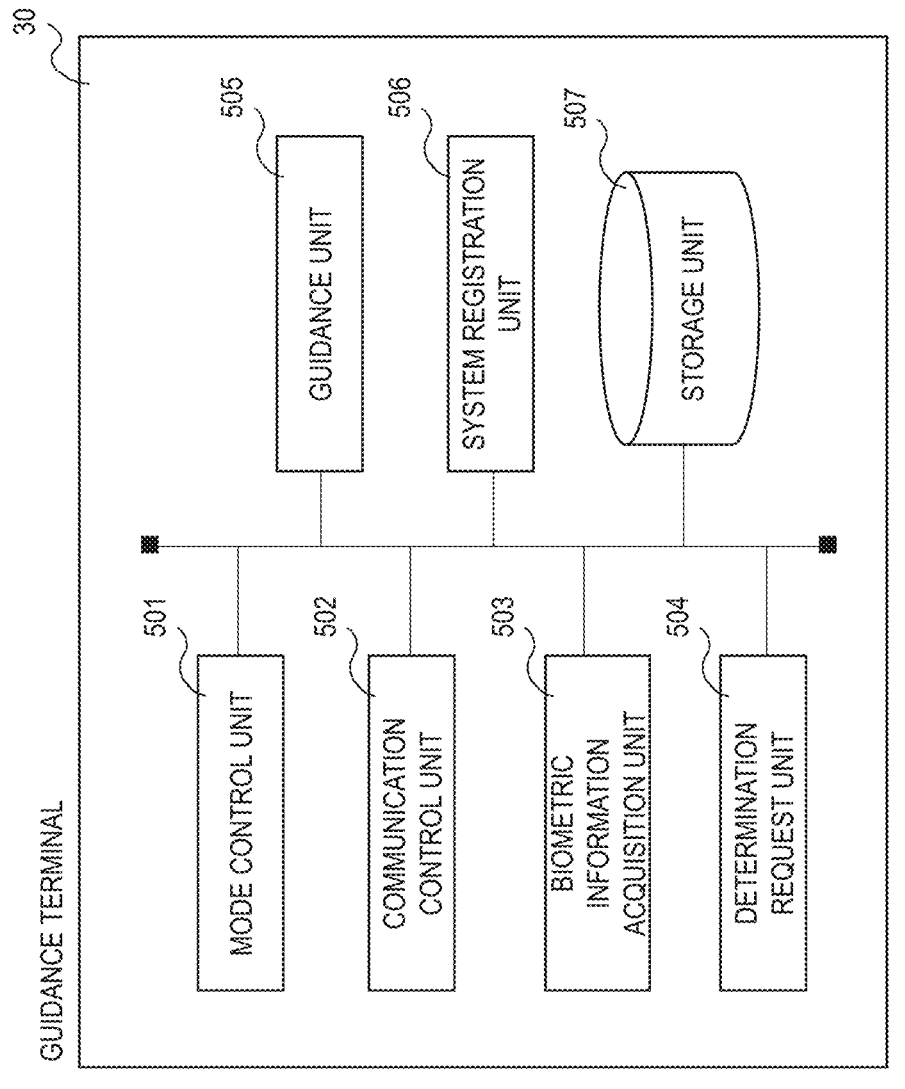
FIG. 12 is a diagram illustrating an example of a processing configuration of a guidance terminal according to the first example embodiment.

FIG. 12 is a diagram illustrating an example of a processing configuration (processing module) of the guidance terminal 30 according to the first example embodiment. Referring to FIG. 12, the guidance terminal 30 includes a mode control unit 501, a communication control unit 502, a biometric information acquisition unit 503, a determination request unit 504, a guidance unit 505, a system registration unit 506, and a storage unit 507.

The mode control unit 501 is means for controlling the mode of operation of the guidance terminal 30. For example, the mode control unit 501 acquires a setting value for the mode of operation (first mode of operation to fourth mode of operation) in accordance with a switch attached to the guidance terminal 30. Alternatively, the mode control unit 501 may acquire the mode of operation using a GUI (Graphical User Interface) displayed on a liquid crystal panel or the like.

As described above, the first example embodiment will describe a case when the first mode of operation (the mode of operation in which the guidance function and the registration function are enabled) is set.

The communication control unit 502 is means for controlling communication with other apparatuses. For example, the communication control unit 502 receives data (packets) from the server apparatus 20. In addition, the communication control unit 502 transmits data to the server apparatus 20. The communication control unit 502 gives data received from other apparatuses to other processing modules. The communication control unit 502 transmits data acquired from other processing modules to other apparatuses. In this way, other processing modules transmit and receive data to and from other apparatuses via the communication control unit 502. The communication control unit 502 includes a function as a receiving unit that receives data from other apparatuses and a function as a transmitting unit that transmits data to other apparatuses.

The biometric information acquisition unit 503 is means for controlling a camera (not shown) and acquiring biometric information of a user (registered person in system, non-registered person in system; target person to be determined). The biometric information acquisition unit 503 takes an image in front of the own apparatus periodically or at predetermined timing. The biometric information acquisition unit 503 determines whether the acquired image includes a human face image, and if the human face image is included, extracts the face image from the acquired image data.

The biometric information acquisition unit 503 hands over the extracted face image to the determination request unit 504.

The determination request unit 504 is means for requesting the server apparatus 20 to determine whether or not the user in front of the guidance terminal 30 is the registered person in system. More specifically, the determination request unit 504 requests the server apparatus 20 to determine whether or not the target person to be determined in front of the guidance terminal 30 is registered in the system to proceed with a predetermined procedure using the authentication terminal compatible with biometric authentication. The determination request unit 504 generates a determination request that includes the acquired face image and transmits the generated determination request to the server apparatus 20.

The determination request unit 504 receives a response (positive response or negative response) from the server apparatus 20 to the determination request. The determination request unit 504 hands over the received determination result (the target person to be determined is the registered person in system or the non-registered person in system) to the guidance unit 505.

The guidance unit 505 is means for guiding the target person to be determined to proceed with a predetermined procedure (for example, a procedure to board an aircraft). The guidance unit 505 outputs a message in accordance with the result of determination of the server apparatus 20. Specifically, the guidance unit 505 guides the registered person in system to the authentication terminal where the registered person in system will proceed (line up), and guides the non-registered person in system to an apparatus, or the like, where the non-registered person in system will proceed (line up).

In the example of FIG. 6, the registered person in system is instructed to go to the boarding gate apparatus 14 on the left side. At that time, the guidance unit 505 displays a message on the liquid crystal panel or the like, for example, as shown in FIG. 13A.

Figures 13A, 13B:
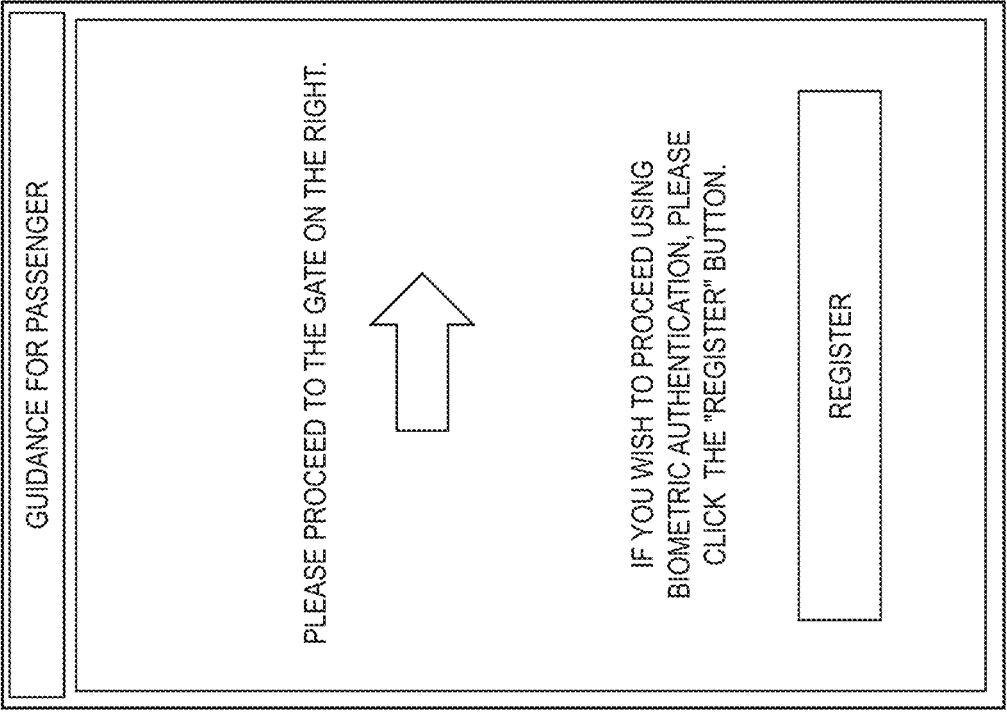
FIGS. 13A and 13B are diagram illustrating an example of a display of the guidance terminal according to the first example embodiment.

Additionally, the non-registered person in system is instructed to go to the boarding gate apparatus 14 on the right side (see FIG. 13B).

In this way, when the target person to be determined is registered in the system, the guidance unit 505 provides guidance regarding the authentication terminal (terminal, device, equipment, and so on, that supports biometric authentication) to the target person to be determined who is registered in the system. When the target person to be determined is not registered in the system, the guidance unit 505 provides guidance regarding an apparatus different from the authentication terminal (terminal, device, apparatus, and so on, that supports a conventional procedure that is different from the biometric authentication method) to the target person to be determined who is not registered in the system.

When the guidance unit 505 provides guidance to the non-registered person in system, the guidance unit 505 displays a GUI to acquire whether or not the non-registered person in system wishes to undergo the boarding procedure using biometric authentication (see FIG. 13B).

When the non-registered person in system wishes to register with the system (when the registration button is pressed), the guidance unit 505 notifies the system registration unit 506 to that effect.

The system registration unit 506 is means for registering a user in the system who wishes to undergo the boarding procedure using biometric authentication.

When the target person to be determined who is not registered in the system wishes to be registered in the system, the system registration unit 506 transmits a token issuance request that includes biometric information of the target person to be determined who is not registered in the system to the server apparatus 20. In this way, the system registration unit 506 requests the server apparatus 20 to register the target person to be determined who is not registered in the system by transmitting the token issuance request.

The system registration unit 506 transmits the token issuance request that includes the biometric information of the person who wishes to be registered in the system, the passport information of the passport held by the person who wishes to be registered in the system, and the boarding pass information of the boarding pass held by the person who wishes to be registered in the system to the server apparatus 20.

Note that an operation of the system registration unit 506 can be the same as the operation of the system registration unit 203 of the check-in terminal 10, so a more detailed description will be omitted.

The storage unit 507 is means for storing information necessary for the operation of the guidance terminal 30.

[System Operation]

Figure 14:
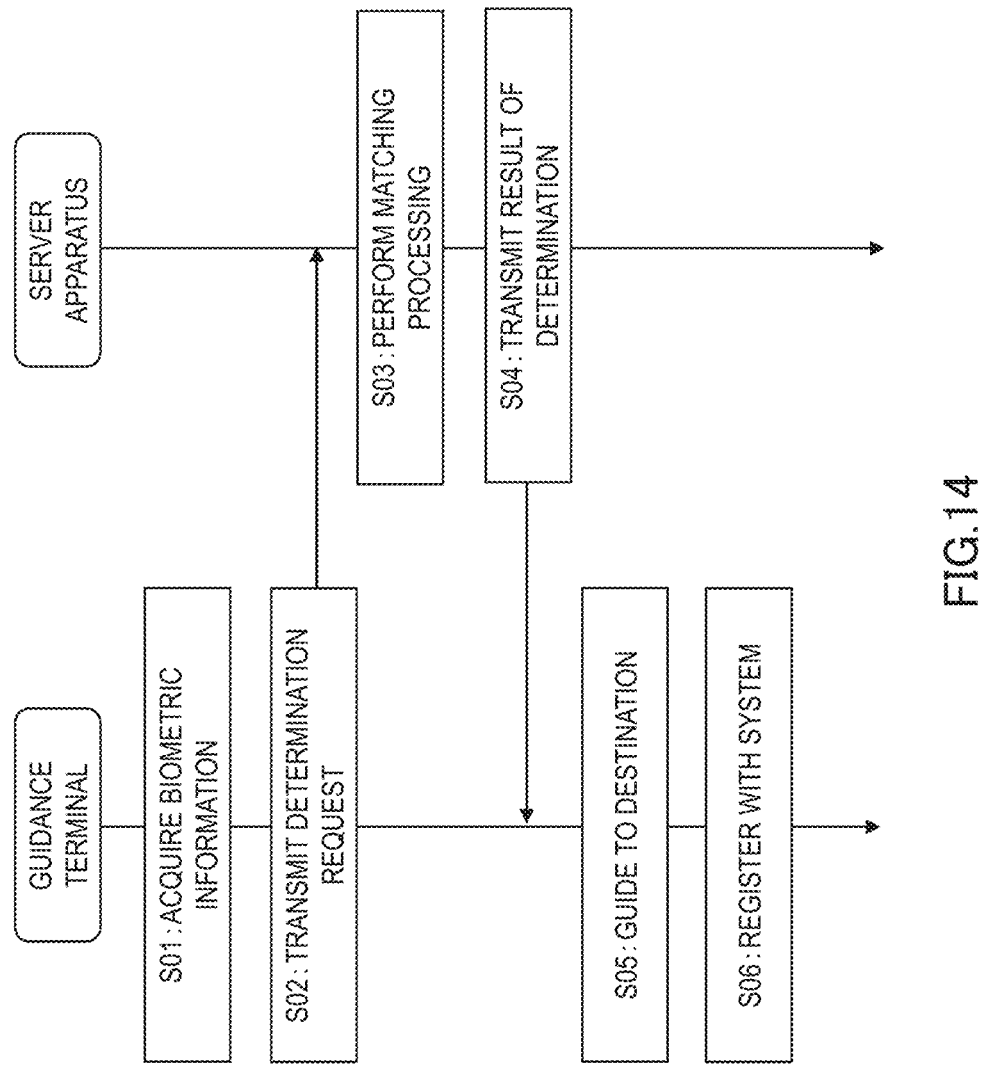
FIG. 14 is a diagram illustrating an example of an operation of the airport management system according to the first example embodiment.

Next, operations of the airport management system according to the first example embodiment will be described. FIG. 14 is a diagram illustrating an example of an operation of the airport management system according to the first example embodiment. Referring to FIG. 14, the operation of the guidance terminal 30 when the guidance terminal provides guidance to a user (allocates a passenger) will be described.

The guidance terminal 30 acquires biometric information of a user (registered person in system, non-registered person in system) in front of guidance terminal 30 (step S01).

The guidance terminal 30 transmits a determination request including the acquired biometric information to the server apparatus 20 (step S02).

The server apparatus 20 performs a matching processing using the biometric information acquired from the guidance terminal 30 and biometric information registered in the registered person information database (step S03).

When the matching processing is successful, the server apparatus 20 determines that the person corresponding to the biometric information transmitted from the guidance terminal 30 is the "registered person in system". When the matching processing fails, the server apparatus 20 determines that the person corresponding to the biometric information transmitted from the guidance terminal 30 is the "non-registered person in system".

The server apparatus 20 transmits the result of determination (target person to be determined is registered person in system, target person to be determined is non-registered person in system) to the guidance terminal 30 (step S04).

The guidance terminal 30 guides the user to a destination (terminal, device, and so on to which the user is heading) based on the result of determination the guidance terminal 30 has acquired (step S05).

When the non-registered person in system wishes to register with the system, the guidance terminal 30 performs processing related to system registration to proceed with the procedure using biometric authentication (step S06). Specifically, the guidance terminal 30 transmits a token issuance request that includes biometric information, passport information, and boarding pass information of the person who wishes to register with the system to the server apparatus 20.

As described above, the guidance terminal 30 according to the first example embodiment is set to the first mode of operation, and the guidance function and the registration function operate. The guidance terminal 30 determines whether a user who has arrived at the procedure area is the registered person in system or the non-registered person in system. When the user is the non-registered person in system and wishes to register with the system, the guidance terminal 30 issues a token by transmitting the biometric information of the user to the server apparatus 20. As a result, even if the user has not completed the procedure for system registration at the check-in terminal 10, the user can register with the system in the procedure area following the check-in lobby, improving convenience for the user. In addition, since a user who has forgotten to complete the procedure for system registration will be rescued, the rate of use of biometric authentication (the rate of token issuance) will increase, and the efficiency of the airport management system will be improved. In other words, spreading the boarding procedure using biometric authentication will increase throughput of the entire airport management system. In addition, the guidance function of the guidance terminal 30 will prevent a user who has not completed the registration procedure for using biometric authentication from entering a lane for the procedure using biometric authentication. As a result, the convenience of the user who uses biometric authentication is maintained because the user who has not completed the necessary procedure will fail the procedure using biometric authentication and will not obstruct the passage of the user who has completed the procedure to use biometric authentication. In other words, it is possible to prevent the throughput of the system from decreasing.

Second Example Embodiment

Next, a second example embodiment will be described in detail with reference to drawings.

The first example embodiment describes the guidance terminal 30 set in the first mode of operation (mode of operation in which the guidance function and the registration function are enabled). The second example embodiment will describe the guidance terminal 30 set to the second mode of operation (the mode of operation in which the guidance function is enabled and the registration function is disabled).

Note that a configuration of the airport management system according to the second example embodiment can be the same as that of the first example embodiment, so the description corresponding to FIG. 3 will be omitted. Moreover, a processing configuration of each terminal (the check-in terminal 10, the baggage drop machine 11, and so on) and the server apparatus 20 according to the second example embodiment can be the same as those of the first example embodiment, so the description thereof will be omitted.

The following description will be made with a focus on the difference between the first example embodiment and the second example embodiment.

The guidance unit 505 of the guidance terminal 30 according to the second example embodiment guides the registered person in system to the terminal to which the registered person in system will head (line up) and guides the non-registered person in system to the terminal to which the non-registered person in system will head (line up).

Figures 15A, 15B:
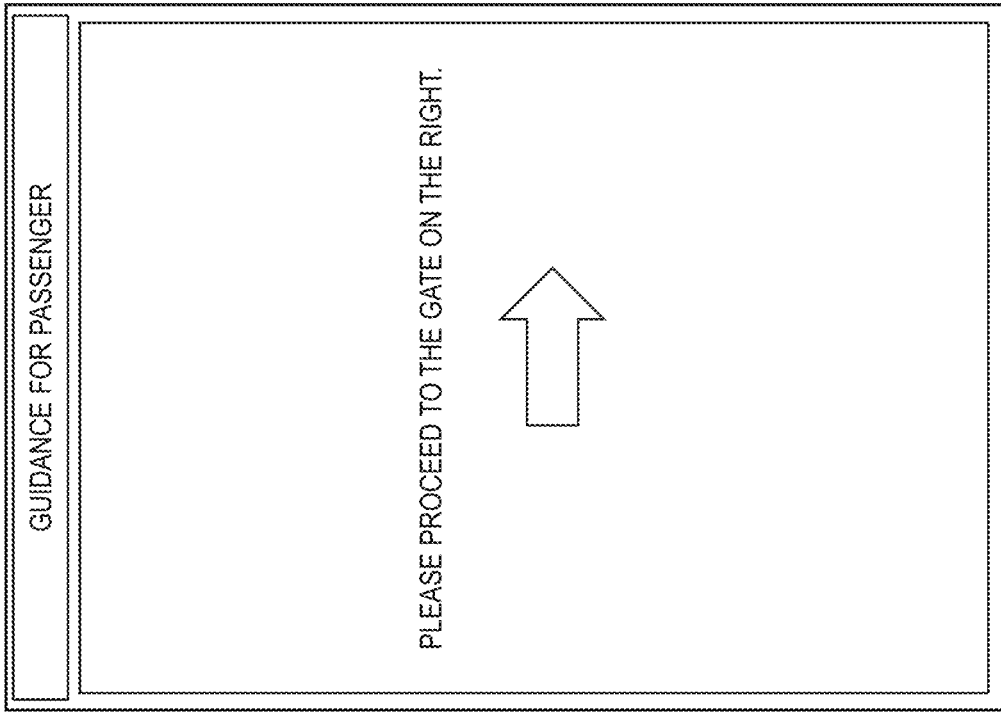
FIGS. 15A and 15B are diagram illustrating an example of a display of a guidance terminal according to a second example embodiment.

For example, the guidance unit 505 provides a display as shown in FIG. 15A and FIG. 15B and indicates the direction in which the user (registered person in system and non-registered person in system) is heading.

Note that the system registration unit 506 of the guidance terminal 30 set to the second mode of operation does not operate.

As described above, the guidance terminal 30 according to the second example embodiment may provide guidance to the user to proceed with the procedure. For example, in a situation where a large number of guidance terminals 30 cannot be installed due to reasons such as limited space for installing the guidance terminals 30 in each procedure area, if the system registration procedure is performed at a small number of guidance terminals 30, a queue will form at the guidance terminals 30. In this way, the guidance terminal 30 can be flexibly operated in accordance with the environment in which the guidance terminal 30 is installed by switching the mode of operation.

Third Example Embodiment

Next, a third example embodiment will be described in detail with reference to drawings.

The second example embodiment describes the guidance terminal 30 set to the second mode of operation (the mode of operation in which the guidance function is enabled). The third example embodiment will describe the guidance terminal 30 set to the third mode of operation and the fourth mode of operation.

As described above, the third mode of operation is the mode in which the guidance function is enabled, the system registration is prompted by other apparatus (terminal or device), and the registration function is disabled. The fourth mode of operation is a mode in which the guidance function is disabled and the registration function is enabled.

As in the second example embodiment, when an opportunity for system registration is not provided to the non-registered person in system, the convenience of the non-registered person in system is decreased. In other words, when the procedure for system registration is not completed, the convenience is decreased because the registered person is not provided with the opportunity to register with the system until the user boards the aircraft. Alternatively, the total number of users who undergo the procedure using biometric authentication is decreased, and the throughput of the entire airport management system is decreased.

The third example embodiment will describe a case where the guidance terminal 30 set to the third mode of operation is used in combination with the guidance terminal 30 set to the fourth mode of operation in order to solve the problem. Note that in the third example embodiment, the guidance terminal 30 is set to a mode of operation that is appropriate for the location where the guidance terminal 30 is installed. For example, the guidance terminal 30 installed in the center of the departure area is set to the third mode of operation, and the guidance terminal 30 installed in the corner of the departure area is set to the fourth mode of operation.

Note that a configuration of the airport management system according to the third example embodiment can be the same as that of the first example embodiment, so the description corresponding to FIG. 3 will be omitted. Furthermore, as a processing configuration of each terminal (the check-in terminal 10, the baggage drop machine 11, and so on) and the server apparatus 20 according to the third example embodiment can also be the same as that of the first example embodiment, the description thereof will be omitted.

The following description will be made with a focus on the difference from the first example embodiment to the third example embodiment.

The guidance unit 505 of the guidance terminal 30 according to the third example embodiment (the guidance terminal 30 set to the third mode of operation) displays a GUI as shown in FIG. 13B when the result of determination by the server apparatus 20 is the "non-registered person in system".

When the non-registered person in system wishes to register with the system by pressing the registration button shown in FIG. 13B (When the non-registered person in system wishes to generate a token), the guidance unit 505 will guide the non-registered person in system who wishes to register with the system to perform the procedure for system registration on another apparatus. For example, the guidance unit 505 displays a message as shown in FIG. 16 to prompt the non-registered person in system who wishes to register with the system to perform the procedures on another device.

Figure 16:
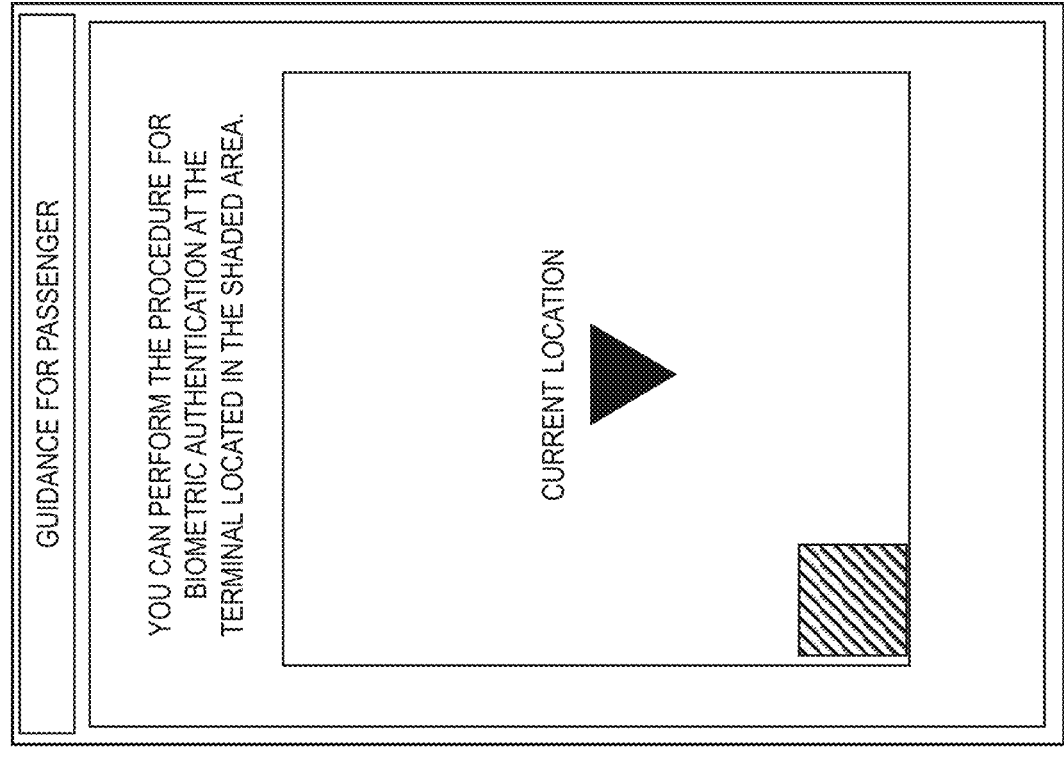
FIG. 16 is a diagram illustrating an example of a display of a guidance terminal according to a third example embodiment.

The guidance terminal 30 set to the fourth mode of operation is installed at the location designated by the guidance terminal 30 set to the third mode of operation (in the shaded area in the lower left corner in the example in FIG. 16).

The determination request unit 504 of the guidance terminal 30 (the guidance terminal 30 set to the fourth mode of operation) according to the third example embodiment hands over the result of determination acquired from the server apparatus 20 (the person to be determined is the registered person in system or the non-registered person in system) to the system registration unit 506.

When the user is the registered person in system, the system registration unit 506 displays the fact that the system registration has already been completed.

Figure 17:
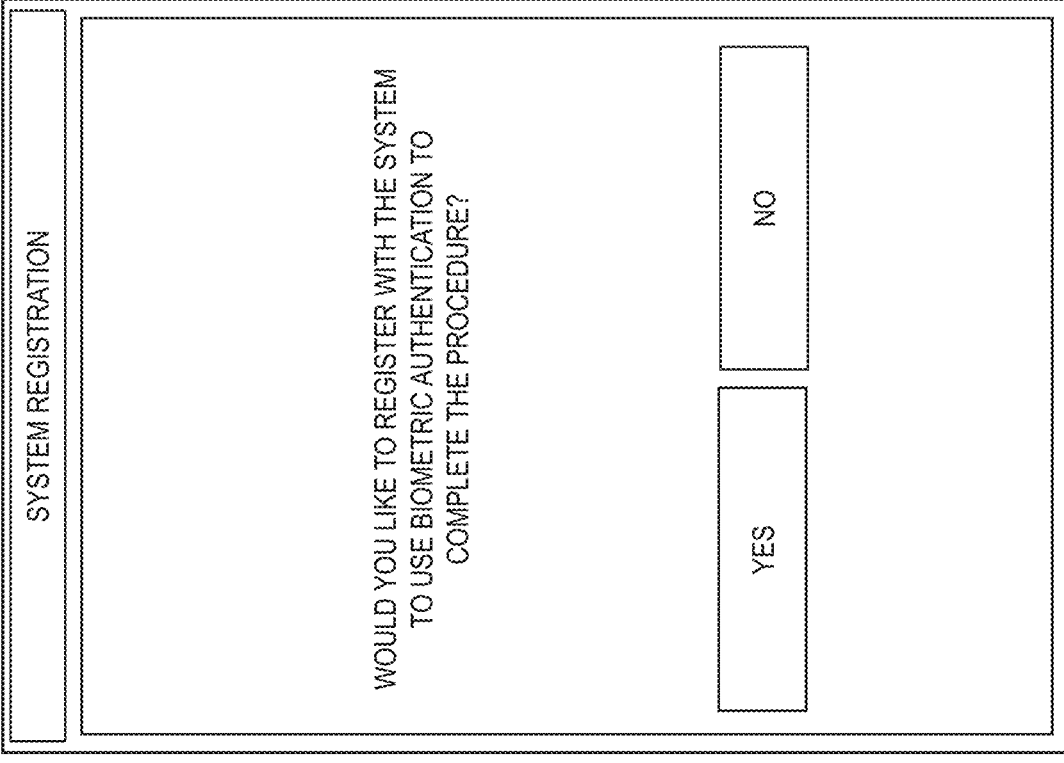
FIG. 17 is a diagram illustrating an example of a display of the guidance terminal according to the third example embodiment.

When the user is the non-registered person in system, the system registration unit 506 displays a GUI as shown in FIG. 17 and acquires whether or not the user wishes to register with the system.

When the user does not wish to register with the system (when the NO button is pressed), the system registration unit 506 will instruct the user to go to a manned booth or the like. Alternatively, the system registration unit 506 may instruct the user to go to the guidance terminal 30 set to the third mode of operation (the guidance terminal 30 with the guidance function enabled).

When the user wishes to register with the system (when the YES button is pressed), the system registration unit 506 acquires biometric information, passport information, and boarding pass information of the user. The system registration unit 506 transmits a token issuing request that includes the acquired biometric information, passport information, and boarding pass information to the server apparatus 20.

When the system registration unit 506 obtains from the server apparatus 20 the fact that the token has been successfully generated (when the system registration unit 506 receives a positive response), the system registration unit

Figure 18:
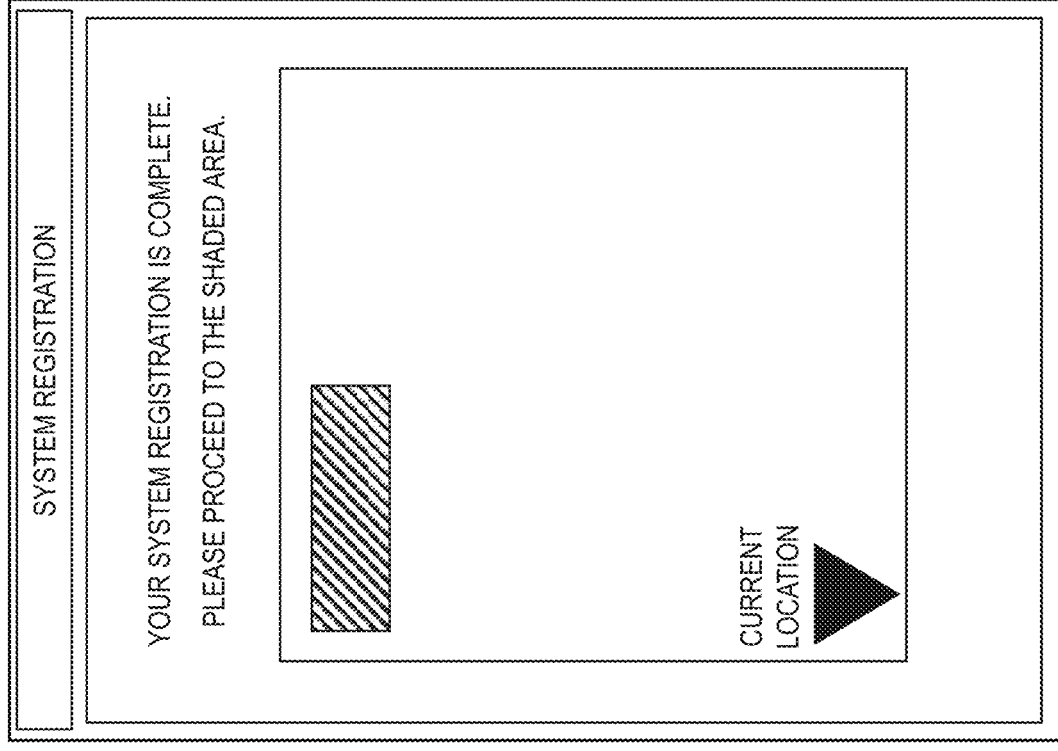
FIG. 18 is a diagram illustrating an example of a display of the guidance terminal according to the third example embodiment.

506 notifies the user who has completed system registration that the subsequent procedure can be carried out by biometric authentication. At that time, the system registration unit 506 may output a message to inform the user who has completed system registration of a direction (terminal to line up) to head (see FIG. 18).

As described above, in the third example embodiment, the guidance terminal 30 set to the third mode of operation cooperates with the guidance terminal 30 set to the fourth mode of operation and realizes the registration of the user who has not completed system registration without causing congestion at the guidance terminal 30. In other words, the guidance terminal 30 set to the third mode of operation acquires whether or not the target person to be determined who is not registered in the system wishes to register with the system. When the target person to be determined who is not registered in the system wishes to register with the system, the guidance terminal 30 prompts the target person to be determined who is not registered in the system to register with the system on a different apparatus from own terminal. Furthermore, the guidance terminal 30 set to the fourth mode of operation does not perform guidance operation, but provides the user with an interface for system registration. In this way, the registration procedure, which requires time for processing, and the guidance operation are performed separately, thereby improving both the convenience of the user and the throughput of the system.

Fourth Example Embodiment

Next, a fourth example embodiment will be described in detail with reference to drawings.

The first to third example embodiments describe that the mode of operation of the guidance terminal 30 is set to a predetermined value, and the guidance terminal 30 operates in the set mode of operation.

The fourth example embodiment will describe a case in which the mode of operation of the guidance terminal 30 is determined by a notification from another apparatus (for example, the server apparatus 20, the boarding gate apparatus 14, and so on). Here, the boarding gate apparatus 14, and so on, are not always in operation, and the operation or non-operation of the boarding gate apparatus 14, and so on is determined in accordance with departure of the aircraft. Therefore, in the guidance terminal 30 that operates in accordance with the boarding gate apparatus 14, there is no point in enabling the guidance function when the boarding gate apparatus 14 is not in operation. Taking these circumstances into consideration, the fourth example embodiment will describe the guidance terminal 30 that, when the boarding gate apparatus 14 is not in operation, prompts the user who has not generated a token to generate the token, and when the boarding gate apparatus 14 is in operation, determines whether or not the token is present and guides the user to an appropriate lane. In other words, the fourth example embodiment will describe the guidance terminal 30 that enables the registration function before the boarding procedure starts and enables the guidance function after the boarding procedure starts.

Note that a configuration of the airport management system according to the fourth example embodiment can be the same as that of the first example embodiment, so the description corresponding to FIG. 3 will be omitted. In addition, the processing configuration of each terminal (the check-in terminal 10, the baggage drop machine 11, and so on) and the server apparatus 20 according to the third example embodiment can also be the same as that of the first example embodiment, so the description thereof will be omitted.

The following description will be made with a focus on the difference from the first example embodiment to the fourth example embodiment.

The mode control unit 301 of the boarding gate apparatus 14 according to the fourth example embodiment notifies each guidance terminal 30 of a mode of operation of own terminal (biometric authentication compatible mode, biometric authentication non-compatible mode, and power off mode) and an installation location ID that identifies an installation location of own terminal.

Note that the installation location ID is, for example, information such as first lane, second lane, and so on. For example, the first lane indicates the boarding gate apparatus 14 installed at the left end, and the second lane indicates the boarding gate apparatus 14 installed second from the left end.

Figure 19:
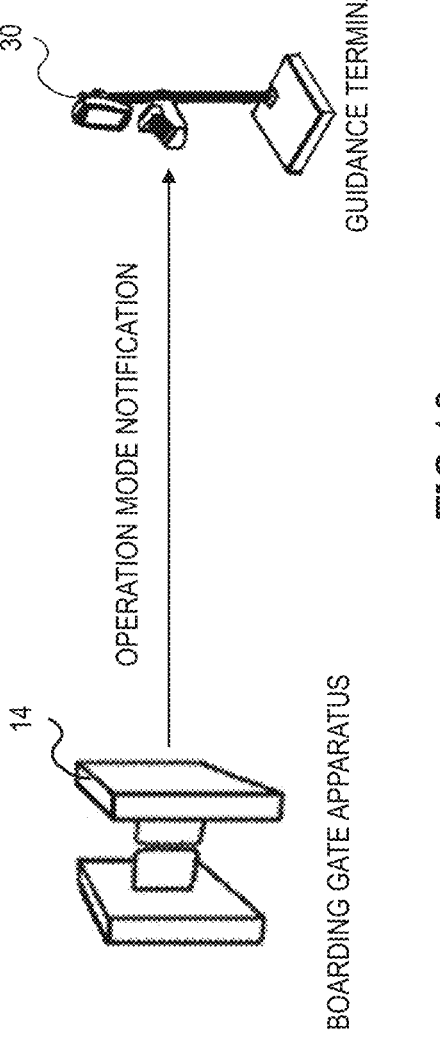
FIG. 19 is a diagram illustrating an operation of an airport management system according to a fourth example embodiment.

The mode control unit 301 of the boarding gate apparatus 14 transmits an "operation mode notification" to each of the guidance terminals 30 that includes the mode of operation of own terminal and the installation location ID (see FIG. 19).

The mode control unit 501 of the guidance terminal 30 according to the fourth example embodiment determines the operation mode of own terminal in accordance with the notified mode of operation of the boarding gate apparatus 14.

For example, when each boarding gate apparatus 14 installed in the departure area is not in operation (mode of operation is power off mode), the guidance terminal 30 sets the mode of operation of own terminal to the fourth mode of operation (mode of operation in which the guidance function is disabled and the registration function is enabled).

On the other hand, when each boarding gate apparatus 14 installed in the departure area is in operation (biometric authentication compatible mode or biometric authentication non-compatible mode), the guidance terminal 30 sets the mode of operation of own terminal to the second mode of operation (mode of operation in which the guidance function is enabled and the registration function is disabled).

In this way, the airport management system may switch between enabling the guidance function to guide a passenger to the appropriate gate when the boarding gate apparatus 14 is in operation and enabling the registration function for generating a token when the boarding gate apparatus 14 is not in operation. More specifically, the mode control unit 501 of the guidance terminal 30 sets the mode of operation to the second mode of operation when the authentication terminal is in operation, and sets the mode of operation to the fourth mode of operation when the authentication terminal is not in operation.

Variation 1 According to the Fourth Example Embodiment

The fourth example embodiment describes a case in which each boarding gate apparatus 14 notifies the guidance terminal 30 of the mode of operation. Here, the mode of operation of the boarding gate apparatus 14 may be set for each boarding gate apparatus 14 via the server apparatus 20. Specifically, the server apparatus 20 may determine the mode of operation (power on, power off) of the boarding gate apparatus 14 based on a departure schedule of the aircraft, or the like, acquired from the DCS. Alternatively, the server apparatus 20 may determine the mode of operation of the boarding gate apparatus 14 (biometric authentication compatible mode, biometric authentication non-compatible mode) based on an instruction from the airport staff member.

Figure 20:
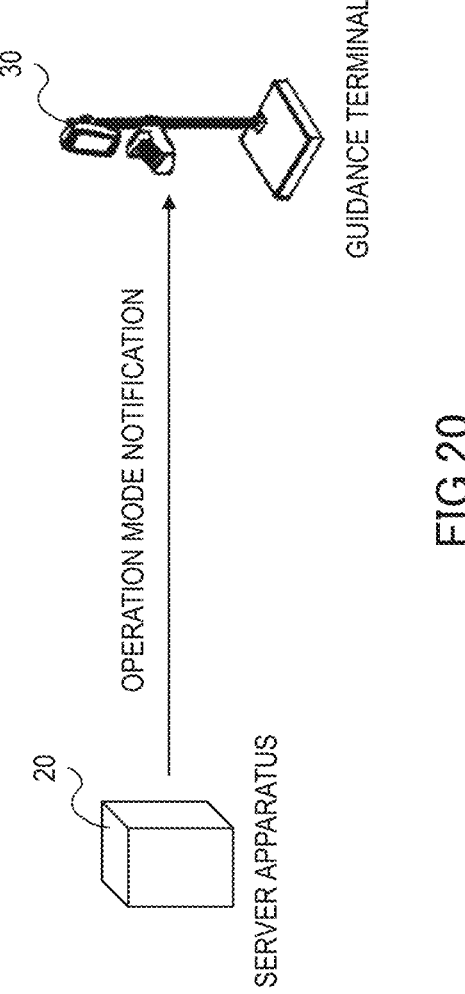
FIG. 20 is a diagram illustrating an operation of the airport management system according to the fourth example embodiment.

In this case, the server apparatus 20 may transmit an operation mode notification to the guidance terminal 30 that includes the mode of operation set for each boarding gate apparatus 14 and an installation location ID (see FIG. 20). The guidance terminal 30 may determine the mode of operation in the same manner as when the guidance terminal 30 receives the operation mode notification from the boarding gate apparatus 14.

As described above, the guidance terminal 30 according to the fourth example embodiment determines the mode of operation of own terminal in accordance with the notification from other apparatus. As a result, flexible operation is possible, such as enabling the registration function while the boarding gate is closed and enabling the guidance function while the boarding gate is open. In other words, since an appropriate mode of operation is automatically set for the guidance terminal 30, the burden on the airline staff member and the like is decreased.

Fifth Example Embodiment

Next, a fifth example embodiment will be described in detail with reference to drawings.

The first to fourth example embodiments describe a case when the guidance terminal 30 is installed within the premises of an airport. However, the guidance terminal 30 may be installed at another facility other than the airport.

The fifth example embodiment will describe a case where the guidance terminal 30 is installed at a facility or the like that is different from the airport.

The following description will be made with a focus on the difference from the first example embodiment to the fifth example embodiment.

Figure 21:
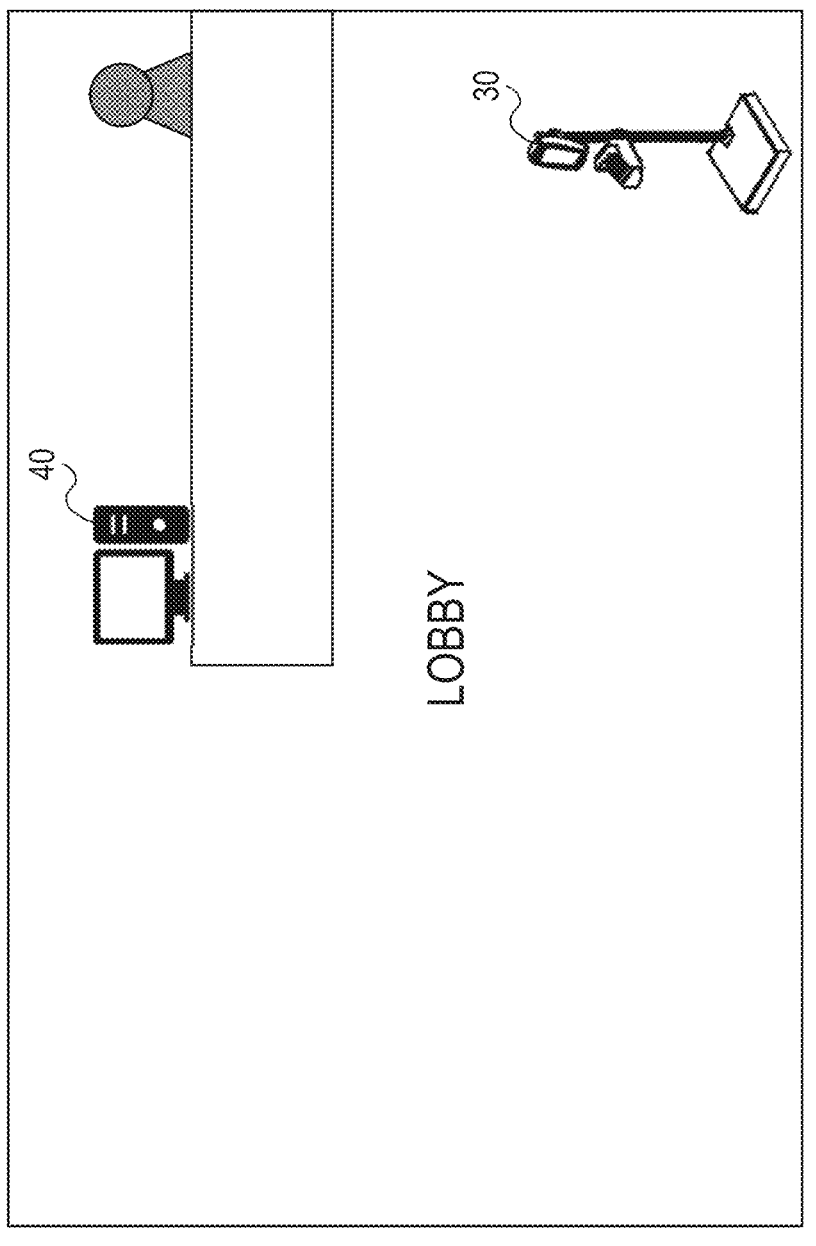
FIG. 21 is a diagram illustrating a configuration according to a fifth example embodiment.

The fifth example embodiment will describe a case when the guidance terminal 30 is installed at a lobby of a hotel (for example, a hotel near an airport), as shown in FIG. 21. The mode of operation of the guidance terminal 30 according to the fifth example embodiment is set to the fourth mode of operation (mode of operation in which the registration function is enabled).

A guest uses a hotel terminal 40 installed at the lobby to perform a check-out procedure. Alternatively, the guest requests a hotel employee to check out, and then follows a prescribed procedure.

When the check-out procedure is completed, the hotel terminal 40 or the employee informs the guest that it is possible for the guest to register with the system to proceed with the boarding procedure using biometric authentication at the guidance terminal 30 installed at the same lobby.

In response to the information, the user (guest) heads to the guidance terminal 30.

When the biometric information acquisition unit 503 of the guidance terminal 30 (the guidance terminal 30 set to the fourth mode of operation) according to the fifth example embodiment detects the user in front of the guidance terminal 30 (when a face image of the user is extracted), the biometric information acquisition unit 503 notifies the system registration unit 506 to that effect.

Figure 22:
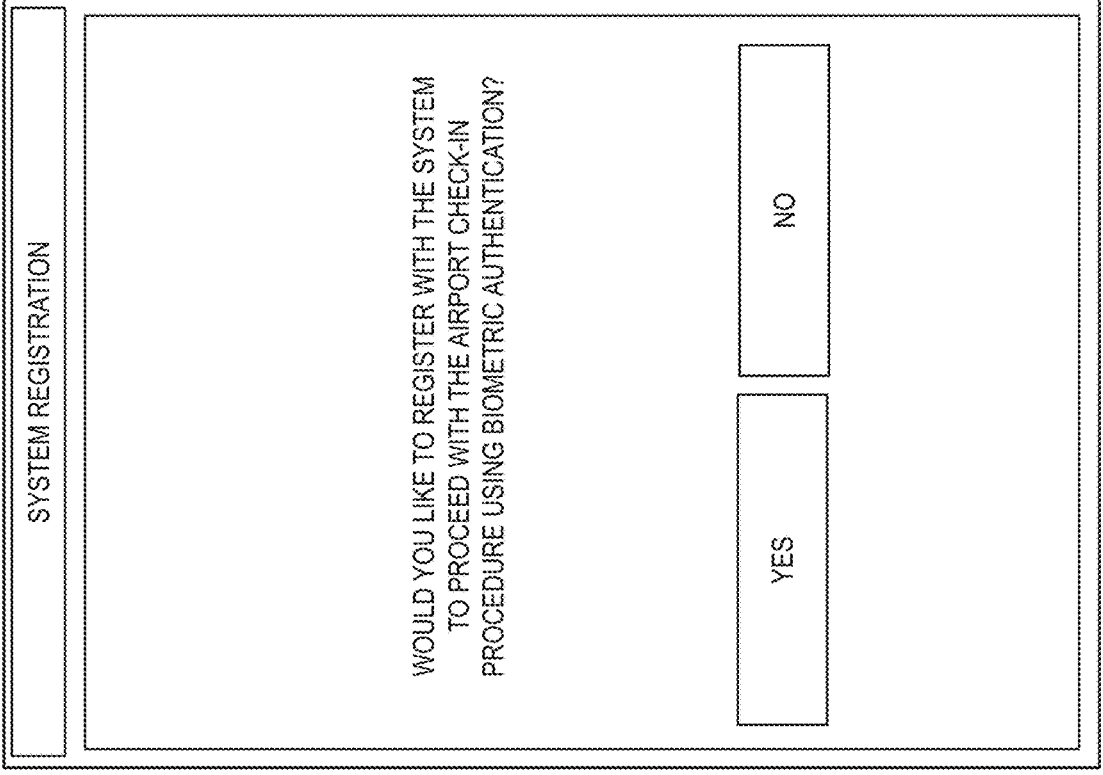
FIG. 22 is a diagram illustrating an example of a display of a guidance terminal according to the fifth example embodiment.

The system registration unit 506 displays a GUI as shown in FIG. 22 and acquires whether or not the user wishes to register with the system.

When the user does not wish to register with the system (when the NO button is pressed), the system registration unit 506 does not perform any particular operation.

When the user wishes to register with the system (when the YES button is pressed), the system registration unit 506 transmits a token issuance request that includes the biometric information of the user to the server apparatus 20.

Note that when the system registration is performed from a facility outside the airport, the guidance terminal 30 acquires information of an airline ticket (airline ticket information) instead of the boarding pass of the user and transmits the information of the airline ticket to the server apparatus 20 together with the biometric information and the passport information.

When an identity verification is successful, the server apparatus 20 generates a token (adds an entry to the registered person information database). When the user for whom the token has been generated has completed the check-in procedure, the server apparatus 20 acquires the boarding pass information of the user from the check-in terminal 10 and adds the boarding pass information to the registered person information database.

Figure 23:
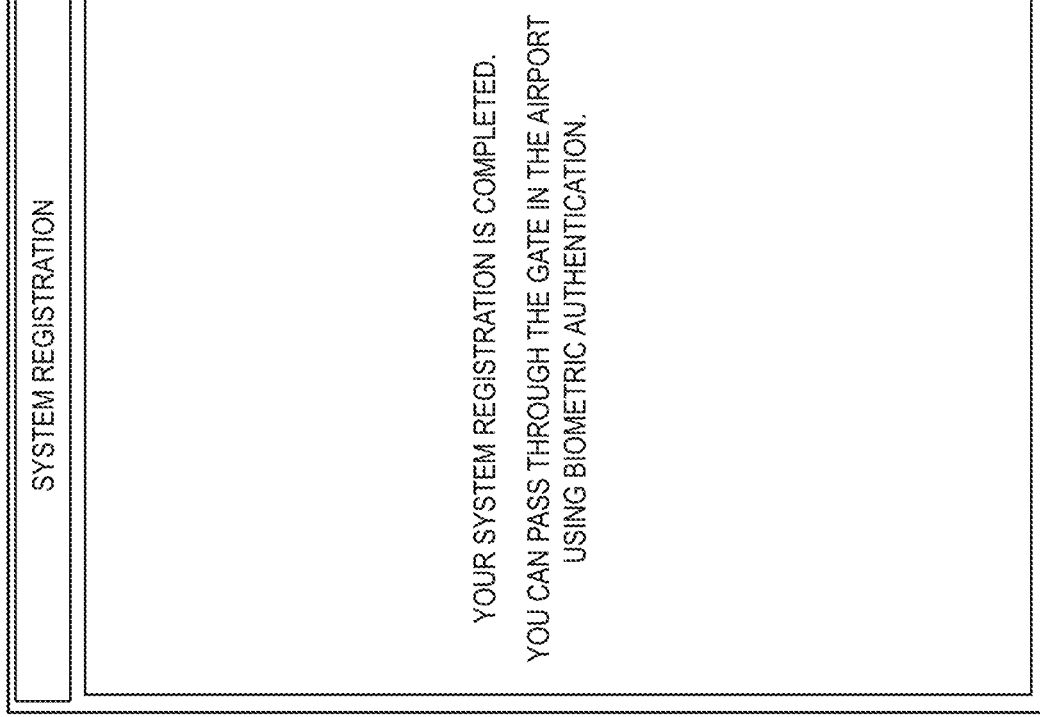
FIG. 23 is a diagram illustrating an example of a display of the guidance terminal according to the fifth example embodiment.

When the system registration unit 506 acquires the fact that the token has been successfully generated from the server apparatus 20 (when the system registration unit 506 receives a positive response), the system registration unit 506 notifies the user who has completed system registration that the procedure at the airport can be performed using biometric authentication (see FIG. 23).

Variation 1 According to the Fifth Example Embodiment

The above fifth example embodiment is based on a premise that the user performs system registration using the check-in terminal 10 or the guidance terminal 30 to proceed with the boarding procedure in the airport using biometric authentication. However, the user can also register with the system using a terminal (a terminal such as a smart phone) that he or she possesses.

In this way, as described in the first example embodiment, and so on, when information of a user has already been registered in the system, the guidance terminal 30 installed in a facility outside the airport acquires biometric information of the user and may transmits a determination request that includes the acquired biometric information to the server apparatus 20. When the result of determination is "the user is the registered person in system," the guidance terminal 30 notifies the user that the user can proceed with the procedure in the airport using biometric authentication.

When the result of determination is "the user is the non-registered person in system", the guidance terminal 30 provides guidance regarding system registration to proceed with the procedure in the airport using biometric authentication to the user.

Note that when the user has completed system registration at own terminal of the user, if the period between the date of system registration and the boarding date is long, the user may forget whether or not the user has performed the system registration. Even in such a case, the user can easily check whether or not the user is registered in the system by using the guidance terminal 30 installed at the hotel or the like.

Variation 2 According to the Fifth Example Embodiment

The function of the guidance terminal 30 according to the fifth example embodiment may be incorporated into a terminal installed at a facility outside of the airport. In the above example in which the guidance terminal 30 is installed at the lobby of the hotel, the function of the guidance terminal 30 may be incorporated into the hotel terminal 40.

Figure 24:
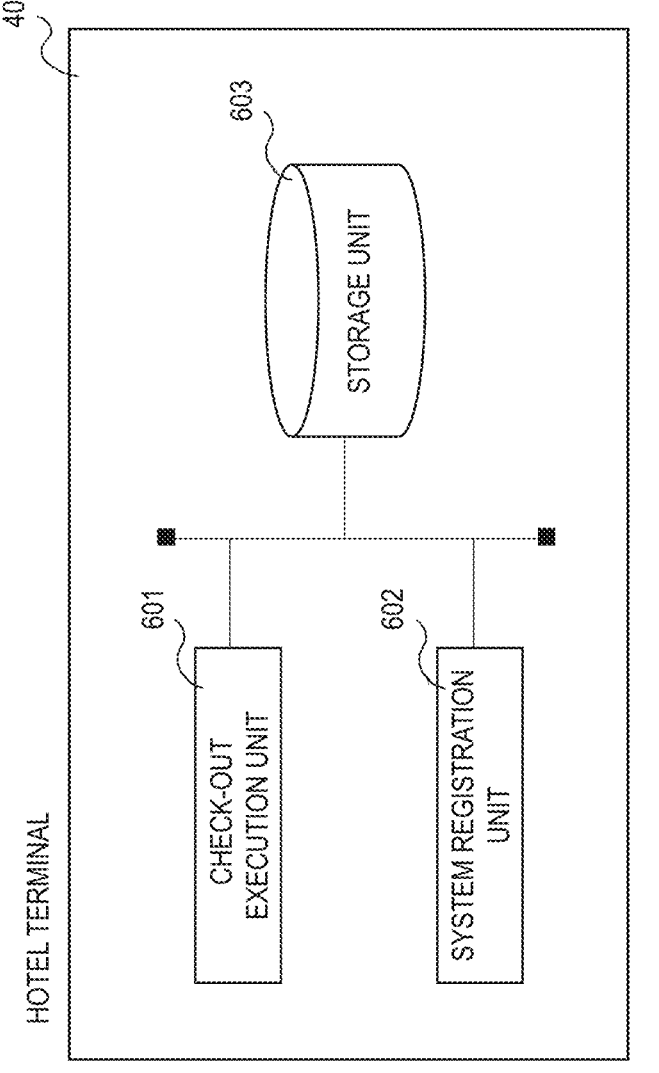
FIG. 24 is a diagram illustrating an example of a processing configuration of a hotel terminal according to the fifth example embodiment.

FIG. 24 is a diagram illustrating an example of a processing configuration (processing module) of the hotel terminal 40 of variation 2 according to the fifth example embodiment. Referring to FIG. 24, the hotel terminal 40 includes a check-out execution unit 601, a system registration unit 602, and a storage unit 603.

The check-out execution unit 601 is means for performing a check-out process related to a hotel guest. When a check-out procedure is completed, the check-out execution unit 601 notifies the system registration unit 602 to that effect.

The system registration unit 602 acquires whether or not the user wishes to register with the system. When the user wishes to register with the system, the system registration unit 602 acquires biometric information, passport information, and airline ticket information of the user, and transmits a token issuance request that includes these information to the server apparatus 20.

The storage unit 603 stores information necessary for operations of the hotel terminal 40.

As described above, in the system according to the fifth example embodiment, the guidance terminal 30 is installed at a facility outside of the airport, and so on. In other words, a multi-function terminal (the guidance terminal 30) that includes both the guidance function and the registration function is not limited to being installed near an AGB (Auto Boarding Gate) or the like, where procedures are performed with biometric authentication, but may also be installed at a facility such as a station, hotel, event venue, and the like. The guidance terminal 30 installed at a facility other than the airport, for example, a hotel, performs a process that prompts the user to generate a token when the token has not been generated at the time the check-out procedure, or the like, is completed. In other words, the guidance terminal 30 may include, in addition to the guidance function and the registration function, a payment function to make payment and a function to perform the check-out procedure, and so on. Moreover, when the guidance terminal 30 is installed at the station, the guidance terminal 30 and a ticket gate may cooperate with each other. For example, at the ticket gate of the means of transportation to the airport, it is determined whether or not a token has been issued using biometric information, and when a token has not been issued, the guidance terminal 30 installed at the same premises may perform a procedure for issuing a token. As a result, more users will use biometric authentication.

Sixth Example Embodiment

Next, a sixth example embodiment will be described in detail with reference to drawings.

The first to fifth example embodiments describe a case in which the guidance terminal 30 includes the function of the system registration for the procedure in the airport.

The sixth example embodiment will describe a case in which the guidance terminal 30 includes a function for system registration for a procedure that is different from the procedure in the airport.

The following description will be made with a focus on the difference from the first example embodiment to the sixth example embodiment.

Figure 25:
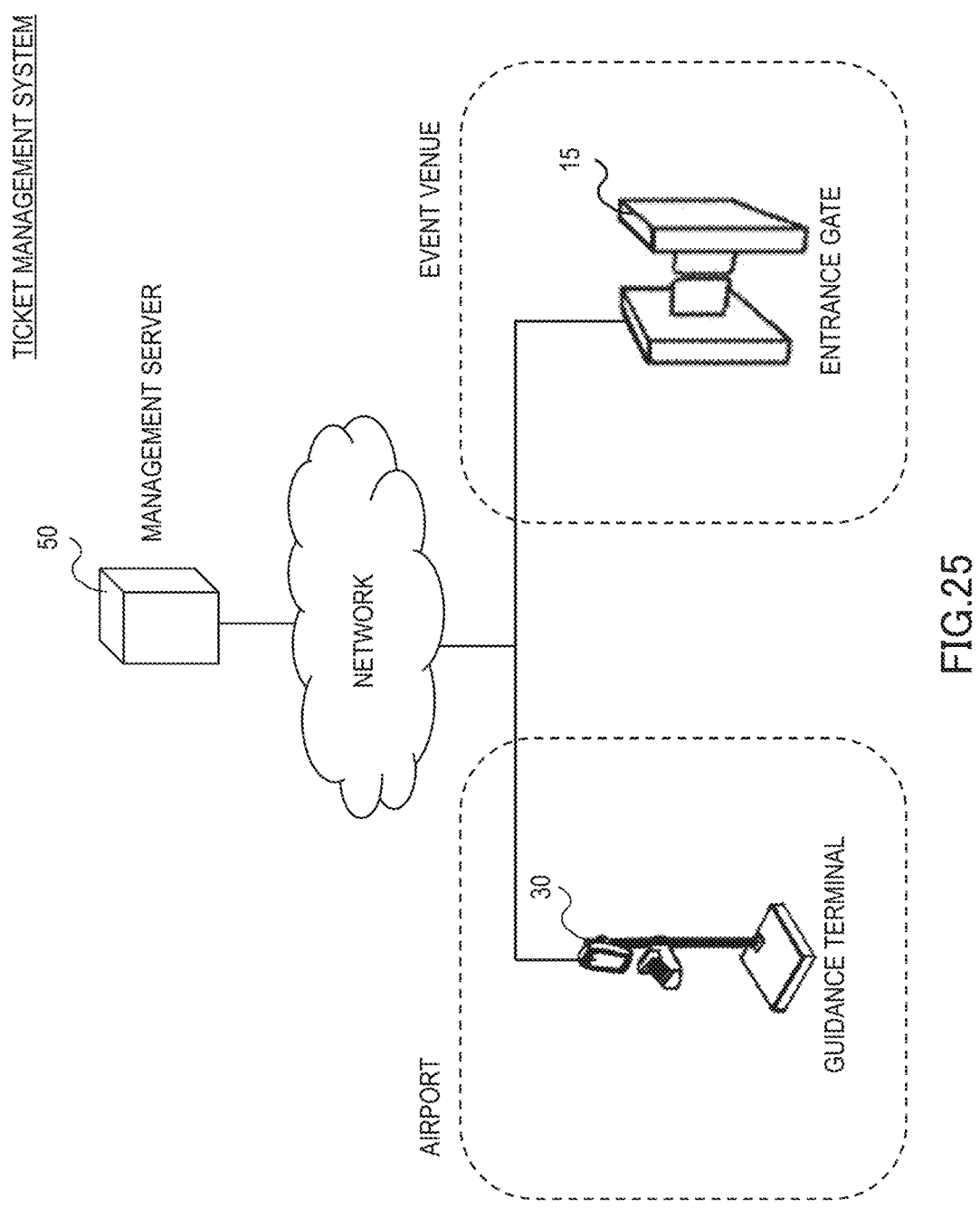
FIG. 25 is a diagram illustrating an example of a schematic configuration of a ticket management system according to a sixth example embodiment.

FIG. 25 is a diagram illustrating an example of a schematic configuration of a ticket management system according to the sixth example embodiment. FIG. 25 shows an example in which the guidance terminal 30 is installed at an airport and an entrance gate 15 is installed at an event venue. Moreover, the ticket management system includes a management server 50.

A user who has purchased a ticket to enter the event venue can perform system registration to enter the event venue using biometric authentication. Specifically, the user performs system registration using the guidance terminal 30.

A mode of operation of the guidance terminal 30 according to the sixth example embodiment is set to the fourth mode of operation (a mode in which the guidance function is disabled and the registration function is enabled).

When the biometric information acquisition unit 503 of the guidance terminal 30 according to the sixth example embodiment detects a user in front of the guidance terminal 30 (when a face image of the user is extracted), the biometric information acquisition unit 503 notifies the system registration unit 506 to that effect.

Figure 26:
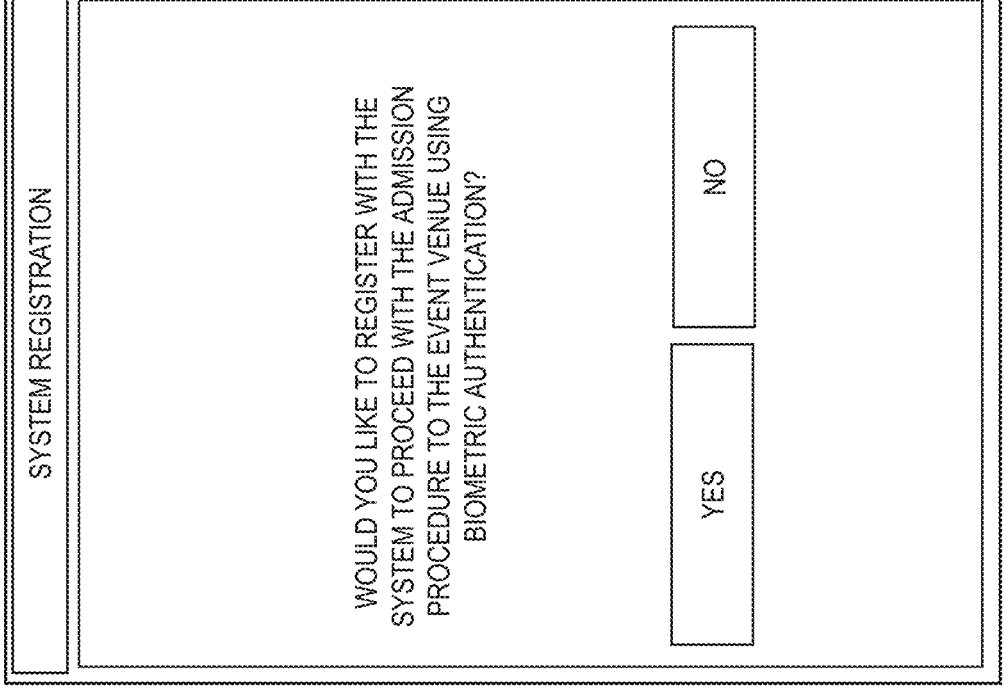
FIG. 26 is a diagram illustrating an example of a display of a guidance terminal according to the sixth example embodiment.

The system registration unit 506 displays a GUI as shown in FIG. 26 and acquires whether or not the user wishes to register with the system.

When the user does not wish to register with the system (when the NO button is pressed), the system registration unit 506 does not perform any particular operation.

When the user wishes to register with the system (when the YES button is pressed), the system registration unit 506 acquires biometric information of the user and information described on a ticket (ticket information). The system registration unit 506 transmits a token issuance request that includes the biometric information and the ticket information to the management server 50.

The management server 50 registers the acquired biometric information and the ticket information in a database (for example, a ticket purchaser database).

When the user arrives at the entrance gate, the entrance gate 15 transmits an authentication request that includes the biometric information of the user to the management server 50.

The management server 50 performs a matching processing using the biometric information acquired from the entrance gate 15 and biometric information registered in advance, and checks the ticket information of the identified user. When it is determined that the identified user is eligible to enter the event venue based on the ticket information of the identified user, the management server 50 notifies the entrance gate 15 of authentication success.

When the matching processing fails, or when it is determined that the identified user is not eligible to enter the event venue, the management server 50 notifies the entrance gate 15 of authentication failure.

When the entrance gate 15 receives the authentication success, the entrance gate 15 opens a gate and permits the person to pass through. When the entrance gate 15 receives the authentication failure, the entrance gate 15 closes the gate and rejects the user to pass through.

As described above, the guidance terminal 30 according to the sixth example embodiment performs system registration other than the boarding procedure, which is performed outside of the airport. Since the guidance terminal 30 supports system registration other than the boarding procedure, the guidance terminal 30 contributes to the spread of biometric authentication.

Figure 27:
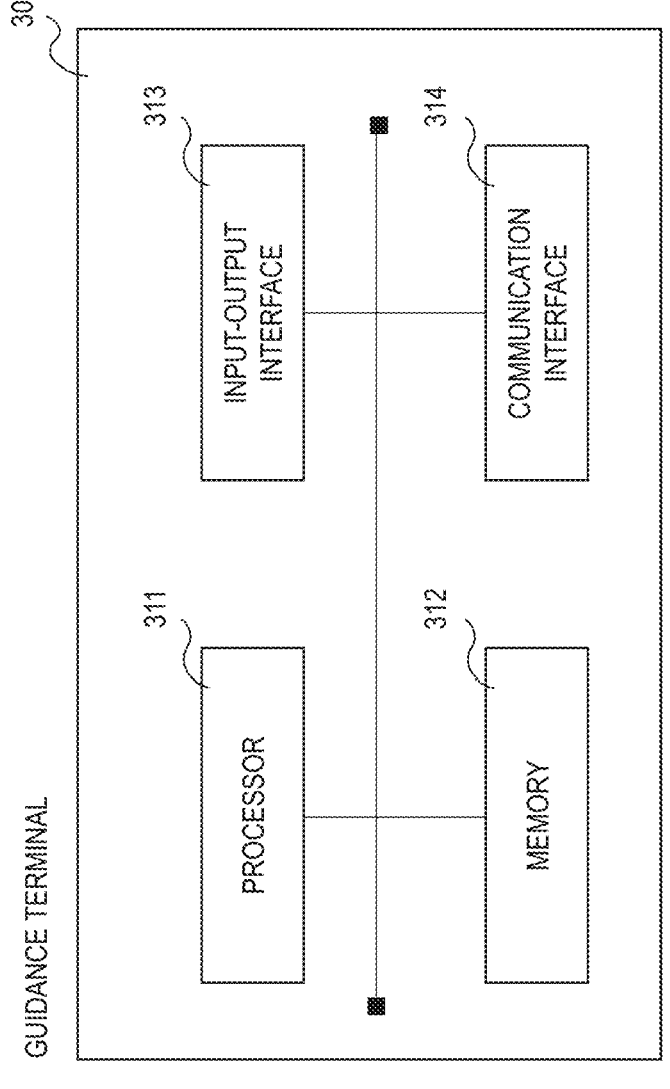
FIG. 27 is a diagram illustrating an example of a hardware configuration of a guidance terminal in the present application.

Next, a hardware configuration of an individual apparatus that constitutes the airport management system will be described. FIG. 27 is a diagram illustrating an example of a hardware configuration of the guidance terminal 30.

The guidance terminal 30 can be configured by an information processing apparatus (a so-called computer) and includes a configuration illustrated as an example in FIG. 27. For example, the guidance terminal 30 includes a processor 311, a memory 312, an input-output interface 313, a communication interface 314, etc. The components such as the processor 311 are connected to an internal bus, and so on so that these components can communicate with each other.

The hardware configuration of the guidance terminal 30 is not limited to the configuration illustrated in FIG. 27. The guidance terminal 30 may include hardware not illustrated or may be configured without the input-output interface 313 if desired. In addition, the number of components, such as the number of processors 311, included in the guidance terminal 30 is not limited to the example illustrated in FIG. 27. For example, a plurality of processors 311 may be included in the guidance terminal 30.

For example, the processor 311 is a programmable device such as a CPU (Central Processing Unit), an MPU (Micro Processing Unit), or a DSP (Digital Signal Processor). Alternatively, the processor 311 may be a device such as an FPGA (Field Programmable Gate Array) or an ASIC (Application Specific Integrated Circuit). The processor 311 executes various kinds of programs including an operating system (OS).

The memory 312 is a RAM (Random Access Memory), a ROM (Read-Only Memory), an HDD (Hard Disk Drive), an SSD (Solid State Drive), or the like. The memory 312 stores an OS program, an application program, and various kinds of data.

The input-output interface 313 is an interface for a display device and an input device not illustrated. For example, the display device is a liquid crystal display or the like. For example, the input device is a device, such as a keyboard or a mouse, which receives user operations.

The communication interface 314 is a circuit, a module, or the like for performing communication with other apparatuses. For example, the communication interface 314 includes a NIC (Network Interface Card) or the like.

The function of the guidance terminal 30 is realized by various kinds of processing modules. The processing modules are realized, for example, by causing the processor 311 to execute a program stored in the memory 312. In addition, this program can be recorded in a computer-readable storage medium. The storage medium may be a non-transient (non-transitory) storage medium, such as a semiconductor memory, a hard disk, a magnetic recording medium, or an optical recording medium. That is, the present invention can be embodied as a computer program product. In addition, the above program may be updated by downloading a program via a network or by using a storage medium in which a program is stored. In addition, the above processing modules may be realized by semiconductor chips.

As is the case with the server apparatus 20 and the check-in terminal 10 can each be configured by an information processing apparatus, and the basic hardware configuration of the server apparatus 20 and the check-in terminal 10 is the same as that of the guidance terminal 30. Thus, description of the basic hardware configuration of the server apparatus 20 and the check-in terminal 10 will be omitted.

Similarly, the guidance terminal 30, which is an information processing apparatus, includes a computer and can realize the functions of the guidance terminal 30 by causing the computer to execute a program. In addition, the guidance terminal 30 executes a control method of the guidance terminal 30 by using this program.

Variations

The configurations, operations, or the like of the airport management system according to the above example embodiments are examples and do not limit the present system configuration, and so on.

The above example embodiments describe when the guidance terminal 30 provides guidance regarding the terminal used by the user (the authentication terminal that supports biometric authentication, the terminal that does not support biometric authentication, apparatus, and so on). Here, the guidance terminal 30 may provide general guidance, such as "the terminal on the left" or "the terminal on the right," or the guidance terminal 30 may provide detailed guidance regarding the terminal that each user is heading to. For example, the guidance terminal 30 may provide guidance that directly specifies the terminal, such as "Please proceed to the first lane".

Alternatively, instead of the guidance terminal 30 determining the content of the guidance, the server apparatus 20 may determine the content of the guidance. For example, the server apparatus 20 (determination request processing unit 404) may specify the authentication terminal to which the guidance terminal 30 guides each user (registered person in system and non-registered person in system) along with the result of determination request.

At that time, the server apparatus 20 may determine the authentication terminal to be notified to each guidance terminal 30, taking into consideration operating status and congestion of the authentication terminals (for example, the boarding gate apparatus 14; ABG (Automated Border Gate) gate). For example, the server apparatus 20 may determine the authentication terminal to notify each guidance terminal 30 in order so that the number of users who line up at each authentication terminal becomes equal. In other words, the server apparatus 20 may dynamically determine the authentication terminal in a round-robin manner and notify each guidance terminal 30 of the determined authentication terminal.

The above example embodiments describe a case in which the authentication terminal (for example, the boarding gate apparatus 14) determines whether or not a user is permitted to pass through the gate. However, the server apparatus 20 may also perform the determination. For example, regarding whether or not the user is permitted to pass through the boarding gate 14, the server apparatus 20 may determine whether or not the user is permitted to pass through the boarding gate apparatus 14 based on the boarding pass information and information (airline code, flight number, and the like) set in the boarding gate apparatus 14. The server apparatus 20 may set the result of the authentication processing (authentication success, authentication failure) based on the result of determination.

The above example embodiments describe a case in which the server apparatus 20 determines whether or not the user is the registered person in system (whether or not a token has been issued to the user). When the user is determined to be the registered person in system, the server apparatus 20 may determine whether or not the user has arrived at a correct boarding gate (the location where the boarding gate apparatus 14 is installed). Specifically, the server apparatus 20 may determine whether or not the user can pass through the boarding gate apparatus 14 based on the operation information (boarding pass information) of the registered person in system and the information (airline code, flight number) by which the boarding gate apparatus 14 determines whether or not the user can board. When it is determined that the user cannot pass through the boarding gate apparatus 14, the server apparatus 20 may acquire the boarding gate to which the user should go and boarding start time based on the boarding pass information of the user, and may notify the guidance terminal 30 of the acquired information such as the boarding gate, and so on. The guidance terminal 30 may present the notified information to the user. For example, the guidance terminal 30 displays a message such as, "Your correct boarding gate is gate No. 3, please proceed to the gate No. 3". In this way, the guidance terminal 30 may inform the user of the correct boarding start time, correct boarding gate, and the like, when the user is heading to a wrong boarding gate (boarding gate apparatus 14).

The above example embodiments describe a case in which biometric information related to a face image is transmitted and received between the apparatuses. However, a feature value generated from the face image may also be transmitted and received between the apparatuses. In this case, the server apparatus 20 on the receiving side may use the received feature value and utilize the received feature value in subsequent processing. Alternatively, biometric information stored in the registered person information database may be a feature value or a face image. When the face image is stored, the feature value may be generated from the face image as needed. Alternatively, both the face image and the feature value may be stored in the registered person information database.

The fourth example embodiment describes that the guidance apparatus 30 acquires the mode of operation of the boarding gate apparatus 14 from the boarding gate apparatus 14 or the server apparatus 20. However, the guidance apparatus 30 may acquire the mode of operation of the boarding gate apparatus 14 by any method other than these methods. For example, the airline staff member may set the mode of operation of the boarding gate apparatus 14 on the guidance terminal 30.

The above example embodiment describes a case in which the registered person information database is configured inside the server apparatus 20, but the database may be established in an external database server or the like. That is, some of the functions of the server apparatus 20 may be implemented in another server. More specifically, the "authentication request processing unit (authentication request processing means)", "determining request processing unit (determining request processing means)", and so on described above may be implemented in any device included in that includes the system.

While the data exchange between each apparatus (the server apparatus 20, the guidance terminal 30, and so on) is not limited to any particular mode, data exchanged between these apparatuses may be encrypted. It is desirable that the passport information and so on are transmitted and received between these apparatuses and encrypted data is transmitted and received in order to properly protect this information.

In the flowcharts and sequence diagrams used in the above description, a plurality of steps (processes) are sequentially described. However, the order of the execution of the steps performed in the individual example embodiment is not limited to the described order. In the individual example embodiment, the order of the illustrated steps may be changed to the extent that a problem is not caused on the content of the individual example embodiment. For example, individual processes may be executed in parallel.

The above example embodiments have been described in detail to facilitate the understanding of the present application disclosed and not to mean that all the configurations described above are needed. In addition, if a plurality of example embodiments have been described, each of the example embodiments may be used individually or a plurality of example embodiments may be used in combination. For example, part of a configuration according to one example embodiment may be replaced by a configuration according to another example embodiment. For example, a configuration according to one example embodiment may be added to a configuration according to another example embodiment. In addition, addition, deletion, or replacement is possible between part of a configuration according to one example embodiment and another configuration.

The industrial applicability of the present invention has been made apparent by the above description. That is, the present invention is suitably applicable, for example, to airport management systems and the like related to users who use aircraft and the like.

A part or the entirety of the example embodiments described above may be described as in the following supplementary notes, but is not limited to the followings.

Supplementary Note 1

A terminal, including:
a determination request unit that transmits to a server apparatus a determination request including biometric information of a target person to be determined regarding a determination as to whether or not a system registration is made to proceed with a predetermined procedure using an authentication terminal that supports biometric authentication; and
a registration unit that requests the server apparatus to register the target person to be determined in a system who is not registered in the system by transmitting a token issuance request including biometric information of the target person to be determined who is not registered in the system to the server apparatus, when the target person to be determined is not registered in the system.

Supplementary Note 2

The terminal according to supplementary note 1, further including a guidance unit that provides a guidance for the target person to be determined to proceed with the predetermined procedure.

Supplementary Note 3

The terminal according to supplementary note 2, wherein, when the target person to be determined is registered in the system, the guidance unit provides the guidance regarding the authentication terminal to the target person to be determined who is registered in the system.

Supplementary Note 4

The terminal according to supplementary note 2 or 3, wherein, when the target person to be determined is not registered in the system, the guidance unit provides the guidance regarding an apparatus different from the authentication terminal to the target person to be determined who is not registered in the system.

Supplementary Note 5

The terminal according to any one of supplementary notes 2 to 4, wherein the guidance unit acquires whether or not the target person to be determined who is not registered in the system wishes to register with the system, and
wherein, when the target person to be determined who is not registered in the system wishes to register with the system, the registration unit transmits the token issuance request to the server apparatus.

Supplementary Note 6

The terminal according to supplementary note 2, further including a mode control unit that controls a mode of operation of own apparatus, wherein, in a first mode of operation, the guidance unit acquires whether or not the target person to be determined who is not registered in the system wishes to register with the system, and, when the target person to be determined who is not registered in the system wishes to register with the system, the registration unit transmits the token issuance request to the server apparatus, and wherein, in a second mode of operation, the guidance unit provides the guidance for the target person to be determined to proceed with the predetermined procedure, and wherein, in a third mode of operation, the guidance unit acquires whether or not the target person to be determined who is not registered in the system wishes to register with the system, and, when the target person to be determined who is not registered in the system wishes to register with the system, the guidance unit prompts to register with the system on a different apparatus from own terminal, and wherein, in a fourth mode of operation, the guidance unit does not operate.

Supplementary Note 7

The terminal according to supplementary note 6, wherein, in the fourth mode of operation, the registration unit transmits the token issuance request including biometric information of the target person to be determined who wishes to register with the system to the server apparatus when the target person to be determined wishes to register with the system.

Supplementary Note 8

The terminal according to supplementary note 6 or 7, wherein the mode control unit sets the mode of operation to the second mode of operation when the authentication terminal is in operation, and sets the mode of operation to the fourth mode of operation when the authentication terminal is not in operation.

Supplementary Note 9

The terminal according to any one of supplementary notes 1 to 8, wherein the registration unit transmits the token issuance request including biometric information, passport information and boarding pass information of the target person to be determined who is not registered in the system to the server apparatus.

Supplementary Note 10

The terminal according to supplementary note 9, installed at a facility that is different from an airport.

Supplementary Note 11

The terminal according to any one of supplementary notes 1 to 5, set to a mode of operation according to an installation location.

Supplementary Note 12

The terminal according to any one of supplementary notes 1 to 11, wherein the biometric information is a face image or a feature value generated from the face image.

Supplementary Note 13

A system, including:
an authentication terminal that supports biometric authentication;
a server apparatus that performs the biometric authentication using biometric information; and
a terminal,
wherein the terminal including:
a determination request unit that transmits to the server apparatus a determination request including biometric information of a target person to be determined regarding a determination as to whether or not a system registration is made to proceed with a predetermined procedure using the authentication terminal; and
a registration unit that requests the server apparatus to register the target person to be determined in a system who is not registered in the system by transmitting a token issuance request including biometric information of the target person to be determined who is not registered in the system to the server apparatus, when the target person to be determined is not registered in the system.

Supplementary Note 14

A control method of a terminal, the control method including:
transmitting to a server apparatus a determination request including biometric information of a target person to be determined regarding a determination as to whether or not a system registration is made to proceed with a predetermined procedure using an authentication terminal that supports biometric authentication; and
requesting the server apparatus to register the target person to be determined in a system who is not registered in the system by transmitting a token issuance request including biometric information of the target person to be determined who is not registered in the system to the server apparatus, when the target person to be determined is not registered in the system.

Supplementary Note 15

A computer-readable storage medium storing a program causing a computer mounted on a terminal to perform processing for:
transmitting to a server apparatus a determination request including biometric information of a target person to be determined regarding a determination as to whether or not a system registration is made to proceed with a predetermined procedure using an authentication terminal that supports biometric authentication; and
requesting the server apparatus to register the target person to be determined in a system who is not registered in the system by transmitting a token issuance request including biometric information of the target person to be determined who is not registered in the system to the server apparatus, when the target person to be determined is not registered in the system.

The entire disclosure of the above patent literature is incorporated herein by reference thereto. While the example embodiments of the present invention have thus been described, the present invention is not limited to these example embodiments. It is to be understood to those skilled in the art that these example embodiments are only examples and that various variations are possible without departing from the scope and sprit of the present invention. That is, the present invention of course includes various variations and modifications that could be made by those skilled in the art in accordance with the overall disclosure including the claims and the technical concept.

REFERENCE SIGNS LIST 10 check-in terminal
11 baggage drop machine
12 passenger clearance system
13 gate apparatus
14 boarding gate apparatus
15 entrance gate
20 server apparatus
30 guidance terminal
40 hotel terminal
50 management server
100 terminal
101 determination request unit
102 registration unit
201 communication control unit
202 check-in execution unit
203 system registration unit
204 message output unit
205 storage unit
301 mode control unit
302 communication control unit
303 biometric information acquisition unit
304 authentication request unit
305 function realization unit
306 storage unit
311 processor
312 memory
313 input-output interface
314 communication interface
401 communication control unit
402 token issuing unit
403 authentication request processing unit
404 determination request processing unit
405 storage unit
501 mode control unit
502 communication control unit
503 biometric information acquisition unit
504 determination request unit
505 guidance unit
506 system registration unit
507 storage unit
601 check-out execution unit
602 system registration unit
603 storage unit

What is claimed is:
1. A terminal, comprising:
at least one memory storing a set of instructions; and at least one processor configured to execute the set of instructions to:
transmit to a server apparatus a determination request including biometric information of a target person to be determined regarding a determination as to whether or not a system registration is made to proceed with a predetermined procedure using an authentication terminal that supports biometric authentication; and
request the server apparatus to register the target person to be determined in a system who is not registered in the system by transmitting a token issuance request including biometric information of the target person to be determined who is not registered in the system to the server apparatus, when the target person to be determined is not registered in the system.

2. The terminal according to claim 1, wherein
the at least one processor is further configured to execute the set of instructions to:
provide a guidance for the target person to be determined to proceed with the predetermined procedure.

3. The terminal according to claim 2, wherein, when the target person to be determined is registered in the system,
the at least one processor is further configured to execute the set of instructions to:
provides the guidance regarding the authentication terminal to the target person to be determined who is registered in the system.

4. The terminal according to claim 2, wherein, when the target person to be determined is not registered in the system,
the at least one processor is further configured to execute the set of instructions to:
provide the guidance regarding an apparatus different from the authentication terminal to the target person to be determined who is not registered in the system.

5. The terminal according to claim 2, wherein
the at least one processor is further configured to execute the set of instructions to:
acquire whether or not the target person to be determined who is not registered in the system wishes to register with the system, and
wherein, when the target person to be determined who is not registered in the system wishes to register with the system,
the at least one processor is further configured to execute the set of instructions to:
transmit the token issuance request to the server apparatus.

6. The terminal according to claim 2, wherein
the at least one processor is further configured to execute the set of instructions to:
control a mode of operation of own apparatus,
wherein, in a first mode of operation,
the at least one processor is further configured to execute the set of instructions to:
acquire whether or not the target person to be determined who is not registered in the system wishes to register with the system, and, when the target person to be determined who is not registered in the system wishes to register with the system,
the at least one processor is further configured to execute the set of instructions to:
transmit the token issuance request to the server apparatus, and
wherein, in a second mode of operation,
the at least one processor is further configured to execute the set of instructions to:

provide the guidance for the target person to be determined to proceed with the predetermined procedure, and wherein, in a third mode of operation, the at least one processor is further configured to execute the set of instructions to:

acquire whether or not the target person to be determined who is not registered in the system wishes to register with the system, and, when the target person to be determined who is not registered in the system wishes to register with the system, the at least one processor is further configured to execute the set of instructions to:

prompt to register with the system on a different apparatus from own terminal, and wherein, in a fourth mode of operation, the at least one processor is configured not provide the guidance for the target person to be determined to proceed with the predetermined procedure.

7. The terminal according to claim 6, wherein, in the fourth mode of operation, the at least one processor is further configured to execute the set of instructions to:

transmit the token issuance request including biometric information of the target person to be determined who wishes to register with the system to the server apparatus when the target person to be determined wishes to register with the system.

8. The terminal according to claim 6, wherein the at least one processor is further configured to execute the set of instructions to:

set the mode of operation to the second mode of operation when the authentication terminal is in operation, and set the mode of operation to the fourth mode of operation when the authentication terminal is not in operation.

9. The terminal according to claim 1, wherein the at least one processor is further configured to execute the set of instructions to:

transmit the token issuance request including biometric information, passport information and boarding pass information of the target person to be determined who is not registered in the system to the server apparatus.

10. The terminal according to claim 9, installed at a facility that is different from an airport.

11. The terminal according to claim 1, set to a mode of operation according to an installation location.

12. The terminal according to claim 1, wherein the biometric information is a face image or a feature value generated from the face image.

13. A system, comprising:

an authentication terminal that supports biometric authentication;

a server apparatus that performs the biometric authentication using biometric information; and a terminal, wherein the terminal comprising:

the at least one processor is further configured to execute the set of instructions to:

transmit to the server apparatus a determination request including biometric information of a target person to be determined regarding a determination as to whether or not a system registration is made to proceed with a predetermined procedure using the authentication terminal; and request the server apparatus to register the target person to be determined in a system who is not registered in the system by transmitting a token issuance request including biometric information of the target person to be determined who is not registered in the system to the server apparatus, when the target person to be determined is not registered in the system.

14. A control method of a terminal, the control method comprising:

transmitting to a server apparatus a determination request including biometric information of a target person to be determined regarding a determination as to whether or not a system registration is made to proceed with a predetermined procedure using an authentication terminal that supports biometric authentication; and requesting the server apparatus to register the target person to be determined in a system who is not registered in the system by transmitting a token issuance request including biometric information of the target person to be determined who is not registered in the system to the server apparatus, when the target person to be determined is not registered in the system.

* * * * *